(12) United States Patent
Lalla et al.

(10) Patent No.: US 12,152,920 B2
(45) Date of Patent: Nov. 26, 2024

(54) CORIOLIS MASS FLOWMETER WITH MAGNETIC FIELD DETECTOR

(71) Applicant: Endress+Hauser Flowtec AG, Reinach (CH)

(72) Inventors: Robert Lalla, Lörrach (DE); Alfred Rieder, Landshut (DE); Ennio Bitto, Aesch (CH); Marcel Braun, Inzlingen (DE)

(73) Assignee: Endress+Hauser Flowtec AG, Reinach (CH)

( * ) Notice: Subject to any disclaimer, the term of this patent is extended or adjusted under 35 U.S.C. 154(b) by 368 days.

(21) Appl. No.: 17/416,133

(22) PCT Filed: Nov. 21, 2019

(86) PCT No.: PCT/EP2019/082048
§ 371 (c)(1),
(2) Date: Jun. 18, 2021

(87) PCT Pub. No.: WO2020/126286
PCT Pub. Date: Jun. 25, 2020

(65) Prior Publication Data
US 2022/0057245 A1    Feb. 24, 2022

(30) Foreign Application Priority Data

Dec. 21, 2018  (DE) ...................... 10 2018 133 475.3
Jan. 11, 2019  (DE) ...................... 10 2019 100 641.4

(51) Int. Cl.
*G01F 1/84*        (2006.01)
(52) U.S. Cl.
CPC .......... *G01F 1/8427* (2013.01); *G01F 1/8431* (2013.01); *G01F 1/8436* (2013.01); *G01F 1/8459* (2013.01)

(58) Field of Classification Search
CPC ...... G01F 1/8427; G01F 1/8459; G01F 25/10; G01F 15/007
See application file for complete search history.

(56) References Cited

U.S. PATENT DOCUMENTS 5,400,653 A    3/1995 Kalotay
6,138,517 A   10/2000 Laursen et al.
(Continued)

FOREIGN PATENT DOCUMENTS

CN    1894561 A   12/2004
CN  103620351 A    3/2014
(Continued)

*Primary Examiner* — Erika J. Villaluna
(74) *Attorney, Agent, or Firm* — Christopher R. Powers; Endress+Hauser (USA) Holding, Inc.

(57) ABSTRACT

The Coriolis mass flowmeter comprises a measuring transducer having a vibration element, an exciter arrangement, and a sensor arrangement The flowmeter further includes an electronic transmitter circuit coupled with the exciter arrangement and the sensor arrangement. The transmitter circuit supplies power to the exciter arrangement to force mechanical oscillations having a wanted frequency. The sensor arrangement includes two electrodynamic oscillation sensors to convert oscillatory movements of the vibration element into an electrical signal having an alternating voltage having an amplitude dependent on the wanted frequency and on a magnetic flux of its oscillation sensor. The sensor arrangement includes a magnetic field detector adapted to convert changes of the magnetic field into a magnetic field signal having an amplitude dependent on a magnetic flux and/or an areal density of the magnetic flux. The transmitter circuit ascertains mass flow measured values and ascertains whether an external magnetic field is present.

26 Claims, 7 Drawing Sheets

(56) References Cited

U.S. PATENT DOCUMENTS

| | | | | |
|---|---|---|---|---|
| 6,363,795 | B1* | 4/2002 | Bergqvist | G01D 5/2451 |
| | | | | 324/207.22 |
| 7,665,369 | B2* | 2/2010 | Bitto | G01F 1/849 |
| | | | | 73/861.355 |
| 9,372,107 | B2* | 6/2016 | Kirst | G01F 1/8436 |
| 2010/0148772 | A1* | 6/2010 | Wenske | G01R 15/146 |
| | | | | 324/259 |
| 2018/0356267 | A1* | 12/2018 | Brockhaus | G01F 15/02 |

FOREIGN PATENT DOCUMENTS

| | | |
|---|---|---|
| CN | 105008871 A | 10/2015 |
| CN | 105899917 A | 8/2016 |
| CN | 207703281 U | 8/2018 |
| DE | 3824351 A1 | 1/1990 |
| DE | 102004014029 A1 | 10/2005 |
| DE | 102016104013 B3 | 4/2017 |
| DE | 102017112950 A1 | 12/2018 |
| DE | 102019133328 A1 | 6/2020 |
| EP | 0644403 A1 | 9/1994 |
| JP | S63186112 A | 8/1988 |
| JP | 2012026776 A | 2/2012 |
| WO | 8803642 A1 | 5/1988 |
| WO | 2012150241 A2 | 11/2012 |
| WO | 2018114402 A1 | 6/2018 |
| WO | 2020126282 A1 | 6/2020 |

\* cited by examiner

CORIOLIS MASS FLOWMETER WITH MAGNETIC FIELD DETECTOR

CROSS-REFERENCE TO RELATED APPLICATIONS

The present application is related to and claims the priority benefit of German Patent Application Nos. 10 2018 133 475.3, filed on Dec. 21, 2018 and 10 2019 100 641.4, filed Jan. 11, 2019 and International Patent Application No. PCT/EP2019/082048, filed on Nov. 21, 2019, the entire contents of which are incorporated herein by reference.

TECHNICAL FIELD

The invention relates to a Coriolis mass flowmeter for measuring mass flow of a fluid measured substance.

BACKGROUND

Used in industrial measurements technology (especially also in connection with the control and monitoring of automated production processes) for highly accurate ascertaining of one or more measured variables, for example, a mass flow and/or a density, of a measured substance, for example, a liquid, a gas or a dispersion, flowing in a process line, for example, a pipeline, are Coriolis mass flowmeters formed by means of a transmitter circuit (most often formed by means of at least one microprocessor) as well as a vibration-type measuring transducer electrically connected with the transmitter circuit and flowed through during operation by the measured substance. Examples of such Coriolis mass flowmeters, in given cases, also supplementally embodied, for example, as density- and/or viscosity measuring devices, are described in, among others, EP-A 564682, EP-A 816807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0071639, US-A 2016/0313162, US-A 2016/0187176, US-A 2017/0003156, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,883,387, 6,920,798, 7,017,424, 7,040,181, 7,077,014, 7,143,655, 7,200,503, 7,216,549, 7,296,484, 7,325,462, 7,360,451, 7,665,369, 7,792,646, 7,954,388, 8,201,460, 8,333,120, 8,695,436, WO-A 00/19175, WO-A 00/34748, WO-A 01/02812, WO-A 01/02816, WO-A 01/71291, WO-A 02/060805, WO-A 2005/050145, WO-A 2005/093381, WO-A 2007/043996, WO-A 2008/013545, WO-A 2008/059262, WO-A 2009/148451, WO-A 2010/099276, WO-A 2013/092104, WO-A 2014/151829, WO-A 2016/058745, WO-A 2017/069749, WO-A 2017/123214, WO-A 2017/137347, WO-A 2017/143579, WO-A 2018/160382, WO-A 2018/174841, WO-A 85/05677, WO-A 88/02853, WO-A 88/03642, WO-A 89/00679, WO-A 94/21999, WO-A 95/03528, WO-A 95/16897, WO-A 95/29385, WO-A 95/29386, WO-A 98/02725, WO-A 99/40394, WO-A 2018/028932, WO-A 2018/007176, WO-A 2018/007185 or the not pre-published German patent application DE102018102831.8.

The measuring transducer of each of the Coriolis mass flowmeters shown therein comprises at least one vibration element, which typically is embodied as an at least sectionally straight and/or at least sectionally bent, e.g. U-, V-, S-, Z- or Q-shaped, measuring tube having a lumen surrounded by a tube wall and conveying the measured substance or which, such as shown in, among others, also WO-A 2018/160382, US-A 2016/0187176 or the above cited patent application DE102018102831.8, can be embodied, for example, also as a displacement element located within a lumen of a tube flowed through by the measured substance. The at least one vibration element is adapted to be contacted by the measured substance, for example, flowed through and/or flowed around by the measured substance, and during that to be caused to vibrate, especially in such a manner that it executes wanted oscillations, namely mechanical oscillations about a rest position with a wanted frequency also co-determined by the density of the measured substance and, consequently, usable as a measure for density. In the case of conventional Coriolis mass flowmeters, not least of all Coriolis mass flowmeters with measuring tube vibration element, typically bending oscillations at a natural resonant frequency serve as wanted oscillations, for example, corresponding to bending oscillations of a natural bending oscillation fundamental mode inherent to the measuring transducer, in which the oscillations of the vibration element are resonant oscillations, which have exactly one oscillatory antinode. The wanted oscillations are in the case of an at least sectionally bent measuring tube as vibration element, additionally, typically so embodied that the measuring tube moves in a pendulum-like manner about an imaginary oscillation axis imaginarily connecting an inlet end and an outlet end of the measuring tube, in the manner of a cantilever clamped at one end, while, in contrast, in the case of measuring transducers having a straight measuring tube as vibration element, the wanted oscillations are most often bending oscillations in a single imaginary plane of oscillation.

It is, additionally, known to excite the at least one vibration element, for example, for the purpose of executing repeating checks of the measuring transducer during operation of the flowmeter, at times, also to momentarily lasting, forced oscillations outside of resonance or, at times, also to enable free, damped oscillations of the at least one vibration element, as well as to evaluate the oscillations, for instance, in order, such as, among other things, described also in the aforementioned EP-A 816 807 US-A 2011/0178738 or US-A 2012/0123705, to detect, as early as possible, possible damage to the at least one vibration element, damage which can bring about an undesired lessening of the accuracy of measurement and/or the operational safety of the flowmeter.

In the case of measuring transducers with two vibration elements each formed as a measuring tube, these are most often incorporated into a process line via a distributor piece extending on the inlet side between the measuring tubes and an inlet end connecting flange as well as via a distributor piece extending on the outlet-side between the measuring tubes and an outlet-side connecting flange. In the case of measuring transducers having as vibration element a single measuring tube, the latter communicates with the process line most often via a connecting tube on the inlet side as well as via a connecting tube on the outlet side. Furthermore, measuring transducers having a single measuring tube as vibration element include, in each case, at least one other vibration element, namely one embodied as a counteroscillator, for example, a tube-, box- or plate shaped counteroscillator, and, equally as well, not contacted by the measured substance. The counteroscillator is coupled to the measuring tube on the inlet side to form a first coupling zone and coupled to the measuring tube on the outlet-side to form a second coupling zone. During operation, the counteroscillator essentially rests or oscillates oppositely to the measuring tube. The inner part of the measuring transducer formed, in such case, by means of measuring tube and counteroscillator is most often held in a protective transducer housing alone by means of the two connecting tubes, via which the measuring tube communicates with the process line during operation. Especially, the inner part is held in the transducer housing in a manner enabling oscillations of the inner part relative to the transducer housing. In the case of the measuring transducers shown, for example, in U.S. Pat. Nos. 5,291,792, 5,796,010, 5,945,609, 7,077,014, US-A 2007/0119264, WO-A 01/02 816 and even WO-A 99/40 394 having a single, essentially straight measuring tube, the latter and the counteroscillator are, such as quite usual in the case of conventional measuring transducers, oriented essentially coaxially relative to one another, in that the counteroscillator is embodied as an essentially straight, hollow cylinder and then arranged in the measuring transducer, such that the measuring tube is surrounded, at least partially, by the counteroscillator. Used as material for such counteroscillator, especially also in the case of application of titanium, tantalum or zirconium for the measuring tube, is, most often, comparatively cost effective steel types, such as, for instance, structural steel or free-machining steel.

For active exciting and maintaining of oscillations of the at least one vibration element, not least of all also the above described, wanted oscillations, measuring transducers of vibration-type have, additionally, at least one electromechanical, typically likewise electrodynamic, oscillation exciter acting during operation on the at least one vibration element. The oscillation exciter electrically connected to the above described transmitter circuit by means of a pair of electrical connection lines, for example, in the form of connection wires and/or in the form of conductive traces of a flexible circuit board, serves, especially, operated by an electrical driver signal generated by drive electronics provided in the transmitter circuit and appropriately conditioned, namely adapted at least to changing oscillation characteristics of the at least one vibration element, to convert an electrical excitation power supplied by means of the driver signal into a mechanical driving force acting on the at least one vibration element at a point of engagement formed by the oscillation exciter. The drive electronics is, especially, also adapted so to set the driver signal by means of internal control that the driver signal has a signal frequency corresponding to the wanted frequency to be excited, which can also change as a function of time, in given cases, at an oscillation amplitude predetermined by an exciter current, namely an electrical current of the driver signal. The driver signal can, for example, during operation of the flowmeter, at times, also be turned off, for example, for the purpose of enabling the above described free, damped oscillations of the at least one vibration element or, for example, such as provided in the above mentioned WO-A 2017143579, in order to protect the drive electronics from overloading.

Oscillation exciters of usually marketed measuring transducers of vibration-type typically involve an oscillation coil working according to the electrodynamic principle, namely an air coil-magnet-arrangement, which is formed by means of an air coil, which, in the case of measuring transducers having a measuring tube and a vibration element formed by a counteroscillator coupled thereto, is most often secured to the latter and has no magnetic core, but rather an air enclosing coil, as well as a permanent magnet serving as armature for interacting with the at least one air coil and secured correspondingly, for example, to the aforementioned measuring tube and in the case of which the air coil is positioned, at least partially, in an air gap of the permanent magnet containing a magnetic flux. Permanent magnet and air coil are, in such case, usually so oriented that they extend essentially coaxially relative to one another, and are, additionally, adapted to be moved relative to one another, or opposite-equally, in such a manner that in the case of exciter current flowing through the air coil, the permanent magnet and the air coil located in its air gap are moved essentially translationally back and forth. Additionally, in the case of conventional measuring transducers, the oscillation exciter is most often so embodied and placed such that it acts essentially at the half length point on the at least one measuring tube. Alternatively to an oscillation exciter acting at the half length point and directly on the at least one vibration element, it is possible, such as, among others, shown in the above mentioned U.S. Pat. No. 6,092,429, for example, also to use exciter arrangements formed by means of two oscillation exciters secured not at the half length point of the at least one vibration element, but, rather at the inlet and outlet sides thereof, for the active exciting of mechanical oscillations of the at least one vibration element or, such as, among others, provided in U.S. Pat. No. B 6,223,605 or U.S. Pat. No. A 5,531,126, for example, also exciter mechanisms formed by means of an oscillation exciter acting between the at least one vibration element and the transducer housing.

As is known, due to the wanted oscillations of the at least one vibration element, not least of all also for the case, in which the wanted oscillations of the at least one vibration element are bending oscillations acting transversely to the flow direction on the flowing measured substance, Coriolis forces dependent on the instantaneous mass flow are induced in the measured substance. These can, in turn, bring about Coriolis oscillations of the vibration element, superimposed on the wanted oscillations, likewise with the wanted frequency and dependent on mass flow, in such a manner that, between inlet side and outlet-side, oscillatory movements of the at least one measuring tube executing the wanted oscillations and simultaneously flowed through by the measured substance, a travel time-, or phase difference can be detected also dependent on mass flow and consequently usable as a measure for the mass flow measurement. In the case of an at least sectionally bent measuring tube as vibration element, in the case of which there is selected for the wanted oscillations an oscillation form, in which the measuring tube is caused to move like a pendulum in the manner of a cantilever clamped at one end, the resulting Coriolis oscillations correspond, for example, to a bending oscillation mode, at times, also referred to as a twist mode, in which the measuring tube executes rotary oscillations about an imaginary rotary oscillation axis directed perpendicularly to the imaginary oscillation axis, while, in contrast, in the case of a straight measuring tube as vibration element, whose wanted oscillations are embodied as bending oscillations in a single imaginary plane of oscillation, the Coriolis oscillations are, for example, bending oscillations essentially coplanar with the wanted oscillations.

For registering both inlet side as well as also outlet-side, oscillatory movements of the at least one vibration element, not least of all also movements corresponding to the wanted oscillations, and for producing at least two electrical, oscillation measurement signals influenced by the mass flow to be measured, measuring transducers of the type being discussed have, furthermore, two or more oscillation sensors spaced from one another along the at least one vibration element, for example, in each case, connected electrically by means of a suitable pair of electrical connection lines with an above described transmitter circuit. Each of the oscillation sensors is adapted to register the above described oscillatory movements at a sensor measuring point and, in each case, to convert such into an electrical, oscillation measurement signal representing the oscillatory movements and containing a wanted component, namely a (spectral) signal-, namely an alternating voltage component having a (signal-)frequency corresponding to the wanted frequency and a (signal-)amplitude dependent on the wanted frequency and a magnetic flux in the oscillation sensor, and to provide the oscillation measurement signal, in each case, to the transmitter circuit, for example, a measuring- and control-electronics of the transmitter circuit, formed by means of at least one microprocessor for additional, in given cases, also digital, processing. Additionally, the at least two oscillation sensors are so embodied and arranged that the above-mentioned wanted component of the oscillation measurement signals generated therewith have, additionally, in each case, a phase angle dependent on mass flow, in such a manner that a travel time-, or phase difference, dependent on mass flow is measurable between the wanted components of the two oscillation measurement signals. Based on the phase difference, the transmitter circuit, or its measuring- and control-electronics, ascertains recurringly mass flow-measured values representing mass flow. In supplementation of the measuring of mass flow, for instance, based on the wanted frequency and/or on an electrical excitation power required for exciting and maintaining the wanted oscillations, or based on the ascertained damping of the wanted oscillations, also the density and/or viscosity of the measured substance can be measured and output from the transmitter circuit together with the measured mass flow in the form of qualified measured values. Typically, the two oscillation sensors are embodied as electrodynamic oscillation sensors, especially equally to the at least one oscillation exciter, formed, in each case, by means of an air coil-magnet-arrangement, in this case, serving as a solenoid generator, in the case of which, likewise, in each case, an air coil is positioned ("plunged"), at least partially, in a magnetic flux containing air gap of an associated permanent magnet and in the case of which, additionally, air coil and permanent magnet are adapted to be moved relative to one another for the purpose of generating an induction voltage, in such a manner that the air coil is moved essentially translationally back and forth in the air gap. The permanent magnet and the air coil are, in such case, usually so oriented that they extend essentially coaxially relative to one another.

It is known that, in the case of application of electrodynamic oscillation sensors, the above described phase angle of the wanted component of each of the oscillation measurement signals can vary, in spite of steady mass flow time rate, thus that the phase difference established between the wanted components can, at times, have a disturbance component not dependent on mass flow, in such a manner that a significant phase error, namely a no longer negligible additional change of the phase difference, is present. Further investigations on conventional Coriolis mass flowmeters have shown that such phase error can occur especially in cases where a Coriolis mass flowmeter is located in the vicinity of one or more electric motors, transformers, (electric-)magnets, inverters or other high electrical current, especially also DC current, parts of a plant, consequently is exposed to an, at times, also very strong, external, additional, magnetic field, namely one originating outside of the Coriolis mass flowmeter, but also passing through the Coriolis mass flowmeter.

As discussed in, among others, also the above cited WO-A 01/02812 and U.S. Pat. No. 7,665,369, one opportunity for reducing the above referenced phase error attributable to external magnetic fields is, for example, so to construct the transducer housing by the use of materials having a relatively high relative magnetic conductivity, for example, free-machining steel or structural steel, that its effective magnetic resistance is significantly decreased. Another opportunity for preventing measurement errors from external magnetic fields would be to provide, such as proposed in U.S. Pat. No. 7,665,369, slits in the magnet cups of the oscillation sensors for suppressing eddy currents caused by external magnetic fields. Investigations have shown, however, that while the above described measures do, indeed, weaken the magnetic fields passing into the transducer-housing and can, as a result, also achieve a contribution to the reduction of the above described disturbance component, that, however, even a combination of both measures cannot always decrease the phase error sufficiently with justifiable technical effort. As a result, in the case of a conventional Coriolis mass flowmeter, it can accordingly not be directly excluded that the mass flow is measured unbeknownst with significantly increased measurement errors due to an unknown external, in given cases, also only temporarily established and/or fluctuating, magnetic field, and that, correspondingly, mass flow-measured values with significantly reduced accuracy of measurement are output.

SUMMARY

Starting from the above described state of the art, an object by the invention is so to improve Coriolis mass flowmeters that therewith also the presence of an external magnetic field, or its influence on the accuracy of measurement, can at least be detected, for example, also be correspondingly timely reported.

For achieving the object, the invention resides in a Coriolis mass flowmeter, for example, a Coriolis mass flow-/density-measuring device, for measuring mass flow of a fluid measured substance, for example, a gas, a liquid or a dispersion, which Coriolis mass flowmeter comprises a measuring transducer, which has at least one vibration element, an exciter arrangement as well as a sensor arrangement and which is adapted to convey the measured substance, namely at least at times to be flowed through by the measured substance, as well as an electronic transmitter circuit electrically coupled with the measuring transducer, namely both with its exciter arrangement as well as also its sensor arrangement, and formed, for example, by means of at least one microprocessor. The at least one vibration element is adapted to be contacted by the flowing measured substance and during that to be caused to vibrate and the exciter arrangement is adapted to convert electrical power supplied to it into mechanical power effecting forced mechanical oscillations of the vibration element. The transmitter circuit is, in turn, adapted to generate an electrical driver signal and therewith to supply electrical power to the exciter arrangement, in such a manner that the vibration element executes, at least partially, wanted oscillations, namely forced mechanical oscillations having at least one wanted frequency, namely an oscillation frequency predetermined by the electrical driver signal, for example, corresponding to a resonant frequency of the measuring transducer, and suitable to bring about in the flowing measured substance Coriolis forces dependent on mass flow. For registering mechanical oscillations of the at least one vibration element, for example, its wanted oscillations, the sensor arrangement includes an electrodynamic, first oscillation sensor and at least an electrodynamic, second oscillation sensor, for example, one embodied equally to the first oscillation sensor. The first oscillation sensor is adapted to convert oscillatory movements of the at least one vibration element at a first measuring point into an electrical, first oscillation measurement signal of the sensor arrangement, in such a manner that the first oscillation measurement signal has at least a first wanted component, namely an alternating voltage component having a frequency corresponding to the wanted frequency, and having an amplitude dependent on the wanted frequency and a first magnetic flux, namely a magnetic flux of the first oscillation sensor and the second oscillation sensor is adapted to convert oscillatory movements of the at least one vibration element at a second measuring point removed from the first measuring point into an electrical, second oscillation measurement signal of the sensor arrangement, in such a manner that the second oscillation measurement signal has at least a second wanted component, namely an alternating voltage component having a frequency corresponding to the wanted frequency and having an amplitude dependent on the wanted frequency and a second magnetic flux, namely a magnetic flux of the second oscillation sensor. For registering a magnetic field established at least partially outside of the first and second oscillation sensors, the sensor arrangement includes at least a first magnetic field detector, for example, one formed by means of a Hall-sensor and/or a reed switch and adapted to convert changes of the magnetic field at a third measuring point removed both from the first measuring point as well as also from the second measuring point into a first magnetic field signal of the sensor arrangement, for example, a first magnetic field signal evaluating and/or quantifying the changes and/or an electrical, first magnetic field signal, which has an amplitude dependent on a third magnetic flux, namely a magnetic flux through the first magnetic field detector and/or on an areal density of the magnetic flux, in such a manner that the first magnetic field signal follows at least a change of the third magnetic flux and/or its areal density with a change of its amplitude. Moreover, the transmitter circuit is, additionally, also adapted to receive and to evaluate both the first and second oscillation measurement signals as well as also the first magnetic field signal, namely based on the first and second oscillation measurement signals to ascertain, for example, also digital, mass flow-measured values representing the mass flow, as well as, based on the first magnetic field signal, to ascertain, at least qualitatively, whether within the measuring transducer an external magnetic field is present, for example, an external magnetic field produced by an electrical field outside of the Coriolis mass flowmeter and/or caused by a magnet positioned outside of the Coriolis mass flowmeter, for example, to ascertain, whether a disturbance of the measuring transducer by an external magnetic field is present, especially a disturbance lessening an ability of the sensor arrangement to function and/or effecting a malfunction of the sensor arrangement and/or reducing integrity of at least one of the first and second oscillation measurement signals, or the mass flow-measured values.

In a first embodiment of the invention, it is, furthermore, provided that the first magnetic field detector is positioned at the first oscillation sensor or in its vicinity, for example, less than 5 cm away.

In a second embodiment of the invention, it is, furthermore, provided that the first magnetic field detector is secured to the at least one vibration element.

In a third embodiment of the invention, it is, furthermore, provided that the exciter arrangement has a, for example, electrodynamic and/or single, oscillation exciter for exciting oscillations of the at least one measuring tube.

In a fourth embodiment of the invention, it is, furthermore, provided that the at least one vibration element is formed by means of at least one tube, for example, an at least sectionally straight tube and/or an at least sectionally circular arc shaped tube, having a lumen surrounded by a tube wall, for example, a metal tube wall, and is adapted to be flowed through by measured substance and during that to be caused to vibrate.

In a fifth embodiment of the invention, it is, furthermore, provided that the first oscillation sensor is formed by means of a first solenoid and the second oscillation sensor is formed by means of a second solenoid.

In a sixth embodiment of the invention, it is, furthermore, provided that the transmitter circuit has a non-volatile electronic data memory, which is adapted to provide digital data, for example, also without application of an operating voltage.

In a seventh embodiment of the invention, it is, furthermore, provided that the first magnetic field signal is an analog signal, for example, a continuous value and continuous time, analog signal, for example, one having a voltage dependent on the third magnetic flux and/or on its areal density. Developing this embodiment of the invention, the transmitter circuit is, furthermore, adapted, based on the first magnetic field signal, to calculate values for at least one magnetic field-characterizing number, for example, a magnetic field-characterizing number characterizing an influencing of the sensor arrangement by the external magnetic field and/or an influencing of at least one of the first and second magnetic fluxes, for example, in such a manner that the magnetic field-characterizing number depends on a deviation of the first magnetic flux from the second magnetic flux and/or evaluates and/or quantifies the deviation or that the magnetic field-characterizing number depends on a deviation of the first magnetic flux from an earlier ascertained, reference value and/or evaluates and/or quantifies the deviation. For example, the transmitter circuit can also be adapted to compare one or more values for the magnetic field-characterizing number, in each case, with one or more reference values for the magnetic field-characterizing number, for example, reference values ascertained by the manufacturer of the Coriolis mass flowmeter and/or in the production of the Coriolis mass flowmeter, for example, one or more reference values representing a lessening of ability of the sensor arrangement to function and/or one or more reference values representing a malfunctioning of the sensor arrangement and/or one or more reference values representing a no longer intact Coriolis mass flowmeter, or to ascertain, whether one or more values for the magnetic field-characterizing number is greater than the at least one reference value for the magnetic field-characterizing number, for example, in case one or more values for the magnetic field-characterizing number is greater than one or more reference values representing a lessening of ability of the sensor arrangement to function and/or greater than one or more reference values representing a malfunction of the sensor arrangement and/or greater than one or more reference values representing a no longer intact Coriolis mass flowmeter, to output a message signaling such.

In an eighth embodiment of the invention, it is, furthermore, provided that the transmitter circuit has a non-volatile electronic data memory, which is adapted to hold digital data available, for example, also without an applied operating voltage, for example, to store one or more earlier ascertained, reference values for the magnetic field-characterizing number, and that the first magnetic field signal is an analog signal, for example, a value- and time continuous, analog signal, for example, having a voltage dependent on the third magnetic flux and/or its areal density. Developing this embodiment of the invention, the transmitter circuit is, furthermore, adapted, based on the first magnetic field signal, to calculate values for at least one magnetic field-characterizing number characterizing, for example, an influencing of the sensor arrangement by the external magnetic field and/or an influencing of at least one of the first and second magnetic fluxes, for example, in such a manner that the magnetic field-characterizing number depends on a deviation of the first magnetic flux from the second magnetic flux and/or evaluates and/or quantifies the deviation or that the magnetic field-characterizing number depends on a deviation of the first magnetic flux from an earlier ascertained, reference value and/or evaluates and/or quantifies the deviation, and it is, additionally, provided that there are stored in the electronic data memory one or more reference values for the magnetic field-characterizing number, for example, reference values earlier ascertained by the manufacturer of the Coriolis mass flowmeter and/or in the production of the Coriolis mass flowmeter and/or during operation of the Coriolis mass flowmeter, for example, one or more reference values representing a lessening of ability of the sensor arrangement to function and/or one or more reference values representing a malfunction of the sensor arrangement. Additionally, the transmitter circuit can, furthermore, be adapted to compare one or more values for the magnetic field-characterizing number, in each case, with one or more reference values for the magnetic field-characterizing number stored in the data memory.

In a ninth embodiment of the invention, it is, furthermore, provided that the first oscillation sensor has a first permanent magnet, for example, connected mechanically with the at least one vibration element to form the first measuring point, as well as a first air coil, and the second oscillation sensor has a second permanent magnet, for example, connected mechanically with the at least one vibration element to form the second measuring point, as well as a second air coil, in such a manner that the first permanent magnet forms a first air gap containing the first magnetic flux and the first air coil is positioned, at least partially, within the first air gap, and the first permanent magnet and the first air coil are adapted to be moved relative to one another by oscillatory movements of the at least one vibration element and to generate a first induction voltage serving as first oscillation measurement signal, and in such a manner that the second permanent magnet forms a second air gap containing the second magnetic flux and the second air coil is positioned, at least partially, within the second air gap, and the second permanent magnet and the second air coil are adapted to be moved relative to one another by oscillatory movements of the at least one vibration element and to generate a second induction voltage serving as second oscillation measurement signal.

In a tenth embodiment of the invention, it is, furthermore, provided that the first magnetic field detector is formed by means of at least one air coil secured at the at least one vibration element, for example, on the first oscillation sensor.

In an eleventh embodiment of the invention, it is, furthermore, provided that the first magnetic field detector is formed by means of at least one Hall-sensor.

In a twelfth embodiment of the invention, it is, furthermore, provided that the first magnetic field detector is formed by means of at least one reed switch.

In a thirteenth embodiment of the invention, the sensor arrangement includes for registering the magnetic field, for example, embodied equally to the first magnetic field detector, furthermore, at least a second magnetic field detector, which is adapted to convert changes of the magnetic field at a fourth measuring point removed from the third measuring point, for example, also removed from the first measuring point and/or from the second measuring point, into a second magnetic field signal of the sensor arrangement, for example, a second magnetic field signal evaluating and/or quantifying the changes and/or an electrical, second magnetic field signal, which has an amplitude dependent on a fourth magnetic flux, namely a magnetic flux of the second magnetic field detector, and/or on an areal density of the magnetic flux, in such a manner that the second magnetic field signal follows at least a change of the fourth magnetic flux and/or its areal density with a change of amplitude, and the transmitter circuit is, furthermore, adapted also to receive and to evaluate the second magnetic field signal, namely based also on the second magnetic field signal to ascertain, whether an external magnetic field is present. Developing this embodiment of the invention, the second magnetic field detector is mounted at the second oscillation sensor or positioned in its vicinity, for example, less than 5 cm away, and/or the second magnetic field signal is an analog signal, for example, having a voltage dependent on the fourth magnetic flux and/or its areal density.

In a fourteenth embodiment of the invention, it is, furthermore, provided that the measuring- and control electronics has a first analog to digital converter for the first oscillation measurement signal as well as a second analog to digital converter for the second oscillation measurement signal.

In a fifteenth embodiment of the invention, it is, furthermore, provided that the transmitter circuit is adapted to ascertain the mass flow measured values with a refresh rate, which is not less, for example, greater, than a refresh rate, with which the transmitter circuit ascertains the values for the sensors characterizing number.

In a sixteenth embodiment of the invention, it is, furthermore, provided that each of the first and second wanted components has, in each case, a phase angle dependent on mass flow. Developing this embodiment of the invention, the transmitter circuit is, furthermore, adapted to calculate the mass flow-measured values based on a phase difference between the first and second wanted components, namely a difference between the phase angle of the first wanted component and the phase angle of the second wanted component.

In a seventeenth embodiment of the invention, it is, furthermore, provided that the first oscillation sensor is formed by means of a first solenoid and the second oscillation sensor by means of a second solenoid.

In a first additional development of the invention, the Coriolis mass flowmeter further comprises: a transducer housing, wherein the at least one vibration element, the exciter arrangement as well as at least partially the sensor arrangement are accommodated within the transducer housing, for example, in such a manner that the at least one vibration element is secured to the transducer housing and/or that the first magnetic field detector is accommodated within the transducer housing and secured thereto.

In a second additional development of the invention, the Coriolis mass flowmeter further comprises: an electronics housing, wherein the transmitter circuit is accommodated within the electronics housing, for example, both the transmitter circuit as well as also the first magnetic field detector are accommodated within the electronics housing.

A basic idea of the invention is affirmatively to register, by means of at least one additional magnetic field detector, an influencing of the sensor arrangement of Coriolis mass flowmeters occasionally occurring as a result of external magnetic fields, and, in given cases, correspondingly to report such.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or additional developments, especially also combinations of, firstly, only individually explained aspects of the invention, result, furthermore, from the figures of the drawing and/or from claims per se.

The figures of the drawing show as follows.

DETAILED DESCRIPTION

Figure 1:
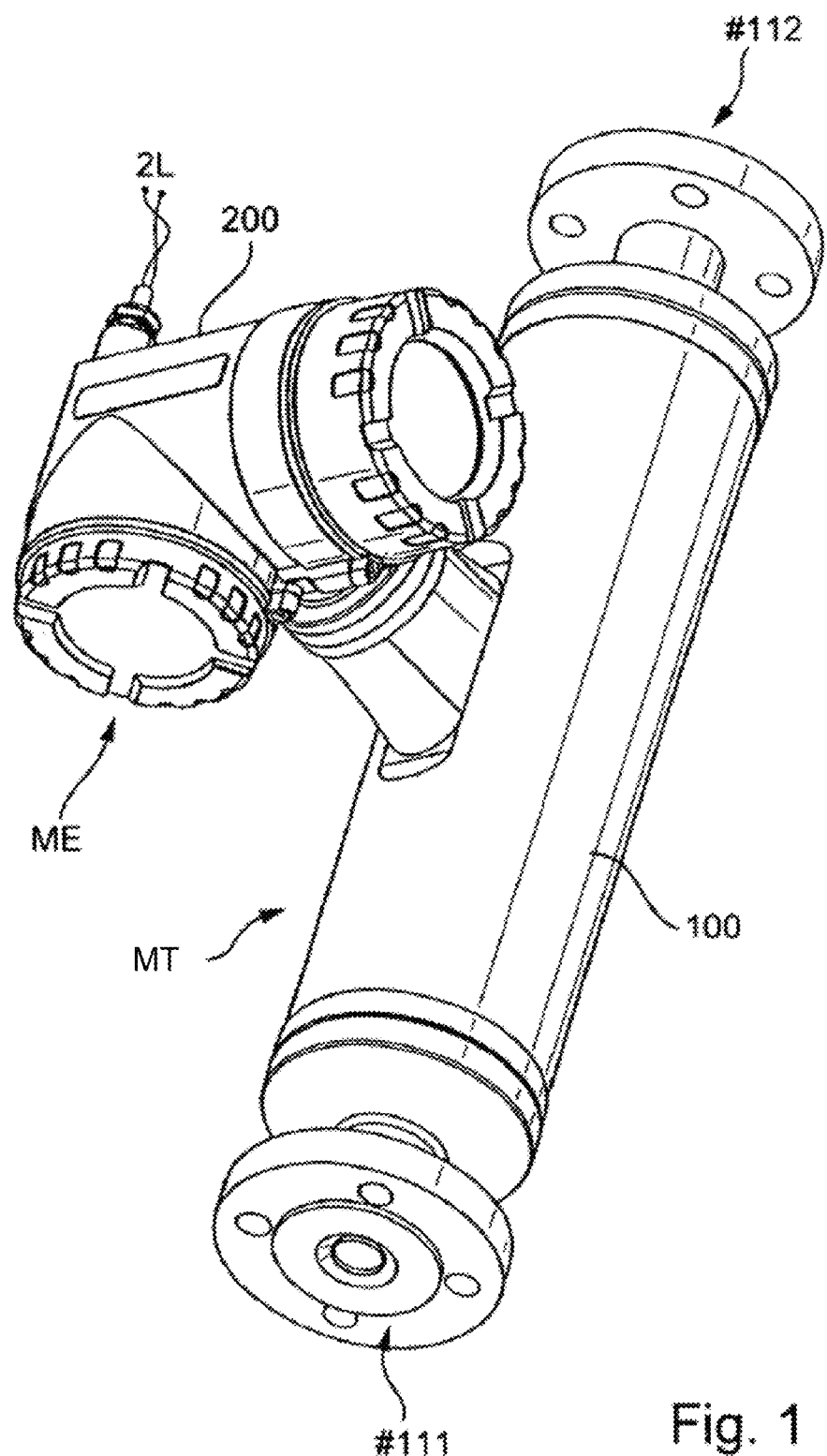
FIG. 1 shows a Coriolis mass flowmeter, in this case embodied as a compact measuring device.
Figure 2:
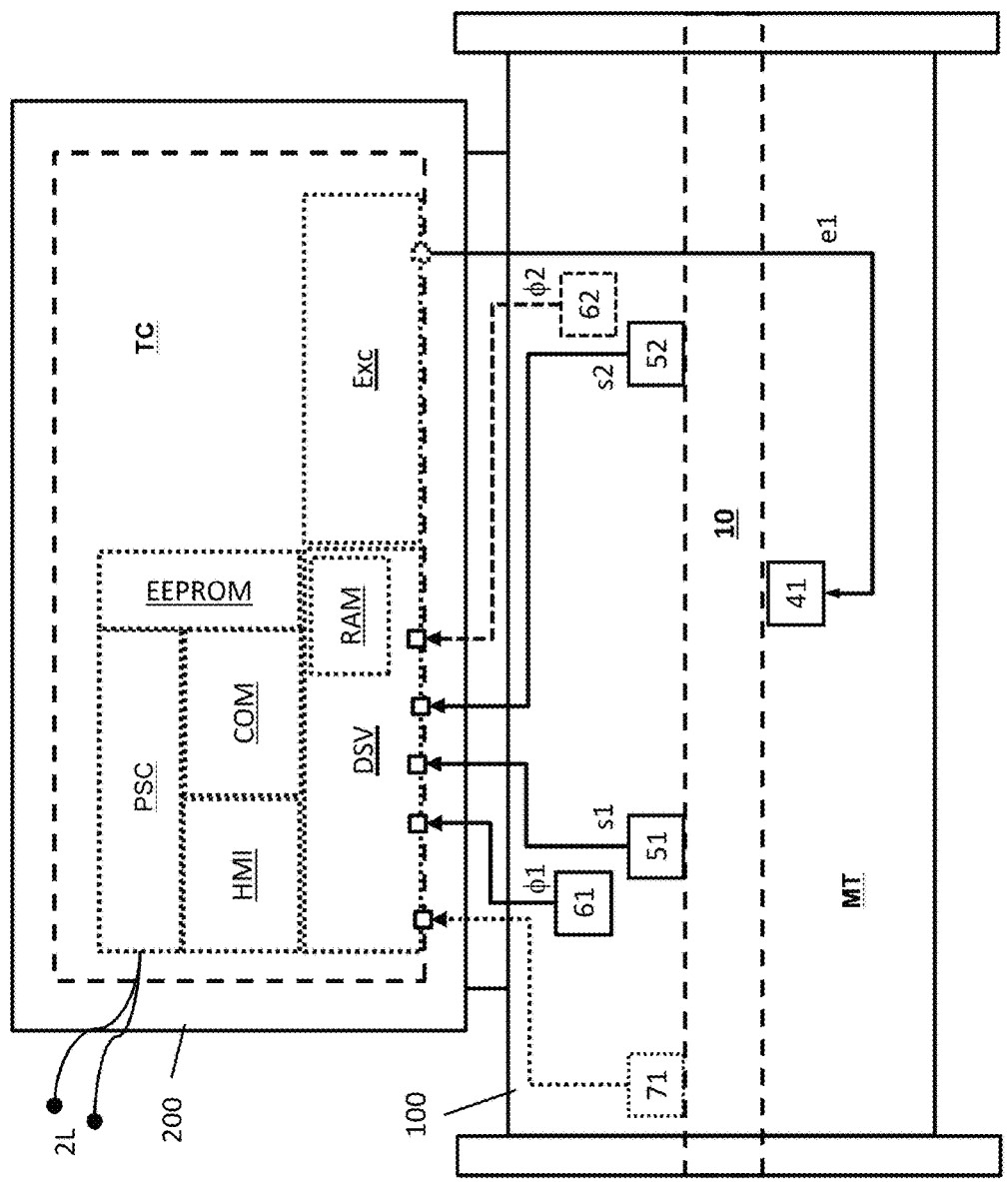
FIG. 2 shows schematically in the manner of a block diagram, a transmitter circuit, especially also one suitable for a Coriolis mass flowmeter of FIG. 1, with a measuring transducer of vibration-type connected thereto, e.g. a Coriolis mass flowmeter of FIG. 1.

Shown in FIGS. 1 and 2 is a Coriolis mass flowmeter insertable into a process line (not shown), such as e.g. a pipeline of an industrial plant, for example, a filling plant or a fueling apparatus, for flowable, especially fluid, or pourable, media, for example, also an, at least at times, 2- or multiphase or nonuniform, measured substance. The Coriolis mass flowmeter serves, especially, for measuring and/or monitoring mass flow m, or ascertaining mass flow-measured values representing mass flow of a measured substance, for example, a gas, a liquid or a dispersion, conveyed in the above described process line, e.g. a fluid measured substance allowed to flow therein, at least at times. Furthermore, the Coriolis mass flowmeter can serve supplementally also to measure a density $\rho$ and/or a viscosity $\eta$ of the measured substance, for example, to ascertain and to output density-measured values representing density and/or viscosity-measured values representing viscosity. In an embodiment of the invention, a Coriolis mass flowmeter is used for ascertaining mass flow-measured values of a measured substance, for example, a liquefied gas, such as e.g. a liquefied gas containing methane and/or ethane and/or propane and/or butane, or a liquefied natural gas (LNG) and even a mixture formed by means of liquid hydrocarbons, for example, a petroleum or a liquid fuel, to be transferred, for example, in a predetermined, or predeterminable, amount from a supplier to a customer. The Coriolis mass flowmeter can, accordingly, for example, also be a component of a transfer location for legally regulated traffic in goods, such as, for instance, a filling plant, and/or as a component of a transfer location, for example, as shown in WO-A 02/060805, WO-A 2008/013545, WO-A 2010/099276, WO-A 2014/151829, WO-A 2016/058745.

The Coriolis mass flowmeter, for example, also one implemented as a Coriolis mass flow-/density-measuring device supplementally measuring density and/or as a Coriolis mass flow-/viscosity-measuring device supplementally measuring viscosity, comprises, connected via an inlet end #111 as well as an outlet end #112 to a process line, a physical to electrical, measuring transducer MT, which is adapted during operation to be flowed through by the measured substance, as well as, electrically coupled with the measuring transducer, an electronic transmitter circuit TC especially one formed by means of at least one microprocessor and/or one supplied during operation with electrical energy by means of an internal energy storer and/or from the exterior via connected cable. The electrical coupling, or connecting, of the measuring transducer MT to the transmitter circuit TC can occur by means of corresponding electrical connection lines and corresponding cable feedthroughs. The connection lines can, in such case, be embodied, at least partially, as electrical line wires surrounded, at least sectionally by an electrical insulation, e.g. line wires in the form of "twisted-pair" lines, flat ribbon cables and/or coaxial cables. Alternatively thereto or in supplementation thereof, the connection lines can at least sectionally also be formed by means of conductive traces of an, especially flexible, in given cases, lacquered, circuit board.

In advantageous manner, the, for example, also programmable and/or remotely parameterable, transmitter circuit TC, can, furthermore, be so designed that it can exchange measuring- and/or other operating data with an electronic data processing system superordinated thereto (not shown), for example, thus, data such as status reports, current measured values or setting values serving for the control of the measuring system—and/or diagnostic values, during operation of the Coriolis mass flowmeter. The electronic data processing system can be, for example, a programmable logic controller (PLC), a personal computer and/or a work station. The data exchange can occur via a data transmission system, for example, a fieldbus system, and/or wirelessly per radio. Accordingly, the transmitter circuit TC can have, for example, a sending and receiving electronics COM, which is fed during operation from a (central) evaluating- and supply unit provided in the above described data processing system and located remotely from the measuring system. For example, the transmitter circuit TC (in particular, its sending and receiving electronics COM) can be so embodied that it is electrically connectable with the external electronic data processing system via a two-conductor connection 2L, in given cases, also configured as a 4-20 mA-electrical current loop, and via that can both draw from the above described evaluating- and supply unit of the data processing system the electrical power required for operation of the Coriolis mass flowmeter as well as also transfer measured values to the data processing system, for example, by (load-)modulation of a direct current supplied from the evaluating- and supply unit. Additionally, the transmitter circuit TC can also be so embodied that it can be operated nominally with a maximum power of 1 W or less and/or is intrinsically safe. The transmitter circuit TC of the Coriolis mass flowmeter of the invention can, additionally, also be constructed modularly, for example, in such a manner that diverse electronic components of the transmitter circuit TC, such as, for instance, a drive electronics Exc for activating the measuring transducer, a measurement- and control electronics DSP for processing measurement signals provided by the measuring transducer and for ascertaining measured values based on measurement signals of the measuring transducer, an internal power supply circuit PSC for providing one or more internal operating voltages and/or the above-mentioned transmitting- and receiving electronics COM serving for the communication with a superordinated measurement data processor system, or an external fieldbus, are, in each case, arranged on a suitable circuit board and/or, in each case, formed by means of a suitable microprocessor. For visualizing measuring device internally produced measured values and/or measuring device internally generated status messages, such as, for instance, a failure message or an alarm, on-site, the Coriolis mass flowmeter can, furthermore, have a display- and interaction element HMI communicating, at least at times, also with the transmitter circuit TC, for example, its above-mentioned measuring- and control electronics DSP, thus, a display- and interaction element HMI including, for instance, an LCD-, OLED- or TFT display located in the aforementioned electronics housing 200 behind a window correspondingly provided therein as well as a corresponding input keypad and/or a touch screen. Furthermore, the transmitter circuit TC can, as well as also directly evident from a combination of FIGS. 1 and 2, furthermore, be accommodated, for example, in its own corresponding, especially impact- and/or even explosion resistant and/or hermetically sealed, electronics housing 200.

The measuring transducer MT is a measuring transducer of vibration-type, namely a measuring transducer having at least one vibration element 10, an exciter arrangement 41 and a sensor arrangement 51, 52, wherein both the exciter arrangement 41 as well as also the sensor arrangement are electrically coupled with the transmitter circuit TC and wherein the at least one vibration element 10 is adapted to be contacted by flowing measured substance, for example, to be flowed through and/or flowed around by measured substance, and during that to be caused to vibrate, for example, with at least one resonant frequency inherent to the vibration element, and to the measuring transducer formed therewith. The exciter arrangement 41 of the measuring transducer MT is, in turn, adapted to convert electrical power supplied to it into mechanical power effecting forced mechanical oscillations of the at least one vibration element 10. In the case of the measuring transducer, it can, accordingly, be, for example, also a conventional measuring transducer of vibration-type known, for example, from the above cited EP-A 816807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0313162, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/093381, WO-A 2007/043996, WO-A 2008/013545, WO-A 2008/059262, WO-A 2010/099276, WO-A 2013/092104, WO-A 2014/151829, WO-A 2016/058745, WO-A 2017/069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40394 or PCT/EP2017/067826. The vibration element 10 can, such as usual in the case of measuring transducers of the type being discussed, and Coriolis mass flowmeters formed therewith, be formed, for example, by means of one or more, especially at least sectionally straight and/or at least sectionally circular arc shaped, tubes each having an, especially metal, tube wall and a lumen surrounded thereby, wherein the tube, or each of the tubes, is adapted, additionally, to convey, in each case, the fluid measured substance flowing at least at times (and flowed through by the measured substance) and during that to be caused appropriately to vibrate. The vibration element can, for example, however, also be formed by means of one or more displacement elements located within a lumen of a tube of the measuring transducer flowed through by the measured substance, wherein the displacement element, or each of the displacement elements, is, in each case, adapted to be flowed around by measured substance and during that to be appropriately caused to vibrate. The at least one vibration element 10 can, furthermore, as well as also indicated in FIG. 2, or directly evident from a combination of FIGS. 1 and 2, be accommodated within a transducer housing 100 together with the exciter arrangement 41 and the sensor arrangement as well as, in given cases, additional components of the measuring transducer. Additionally, the above-mentioned electronics housing 200 can, for example, as well as also shown in FIGS. 1 and 2, be mounted on the transducer housing 100, in order to form a Coriolis mass flowmeter of compact construction.

In an additional embodiment of the invention, the exciter arrangement is, such as quite usual in the case of measuring transducers of vibration-type, formed by means of at least one electromechanical oscillation exciter 41, for example, an electrodynamic, electromagnetic or piezoelectric, oscillation exciter, which can, as well as also indicated in FIG. 2, for example, be so positioned that a force generated therewith acts on the vibration element in the direction of an imaginary force action line extending through a center of mass of the at least one vibration element, and/or which can, as well as also shown in FIG. 2, for example, also be the oscillation exciter of the exciter arrangement, or of the measuring transducer formed therewith, effecting individual oscillations of the vibration element 10.

The transmitter circuit TC of the Coriolis mass flowmeter of the invention is, additionally, among other things, provided and correspondingly adapted to generate an electrical driver signal e1, for example, a bipolar electrical driver signal and/or an, at least at times, periodic, in given cases, also harmonic, electrical driver signal, and therewith to supply electrical power to the exciter arrangement of the measuring transducer MT, in such a manner that the at least one vibration element 10 executes, at least partially, wanted oscillations, namely forced mechanical oscillations having a wanted frequency $f_N$ and being suitable to produce in the flowing measured substance Coriolis forces dependent on mass flow and reacting on the vibration element 10, in such a manner that Coriolis oscillations, namely mechanical oscillations with the wanted frequency $f_N$ supplementally forced by the Coriolis forces and dependent on mass flow m of the measured substance, are superimposed on the above described, wanted oscillations. In the case of the wanted frequency $f_N$, such is an oscillation frequency of the forced mechanical oscillations of the vibration element predetermined by the electrical driver signal e1 and corresponding, for example, to the above described resonant frequency $f_R$ of the measuring transducer, ($f_N=f_R$). The driver signal e1 can, accordingly, be, for example, a harmonic electrical signal forming the above-mentioned signal component $e1_N$ determining the wanted frequency $f_N$, or, for example, also a multi-frequency electrical signal containing a number of (spectral) signal components along with a spectral wanted component $e1_N$ determining the wanted frequency $f_N$. The wanted oscillations excited by means of exciter arrangement 41 and transmitter circuit TC connected thereto can, furthermore, such as quite usual in the case of Coriolis mass flowmeters, be, for example, bending oscillations of the at least one vibration element 10 about an associated rest position, wherein, selected as wanted frequency $f_N$, namely set by means of the driver signal e1, can be, for example, an instantaneous resonant frequency of a bending oscillation fundamental mode of the at least one vibration element 10 having only a single oscillatory antinode and/or a lowest instantaneous resonant frequency of the at least one vibration element 10 dependent also on the density and/or viscosity of the measured substance conveyed in the measuring transducer, and contacting its vibration element 10. For producing the driver signal e1, thus to set the wanted frequency $f_N$, the transmitter circuit TC can, such as quite usual in the case of Coriolis mass flowmeters, have, for example, a corresponding drive electronics Exc, especially one formed by means of one or more phase control loops (PLL—phase locked loop) serving for determining and setting the wanted frequency $f_N$. In an additional embodiment of the invention, the drive electronics Exc includes a digital frequency output. Additionally, the drive electronics Exc is, furthermore, also adapted to output on the frequency output a frequency sequence, namely a sequence of digital frequency values quantifying the signal frequency, for example, the instantaneously set, wanted frequency, set for the driver signal e1 (thus the signal frequency of its signal component eN1).

Figure 3:
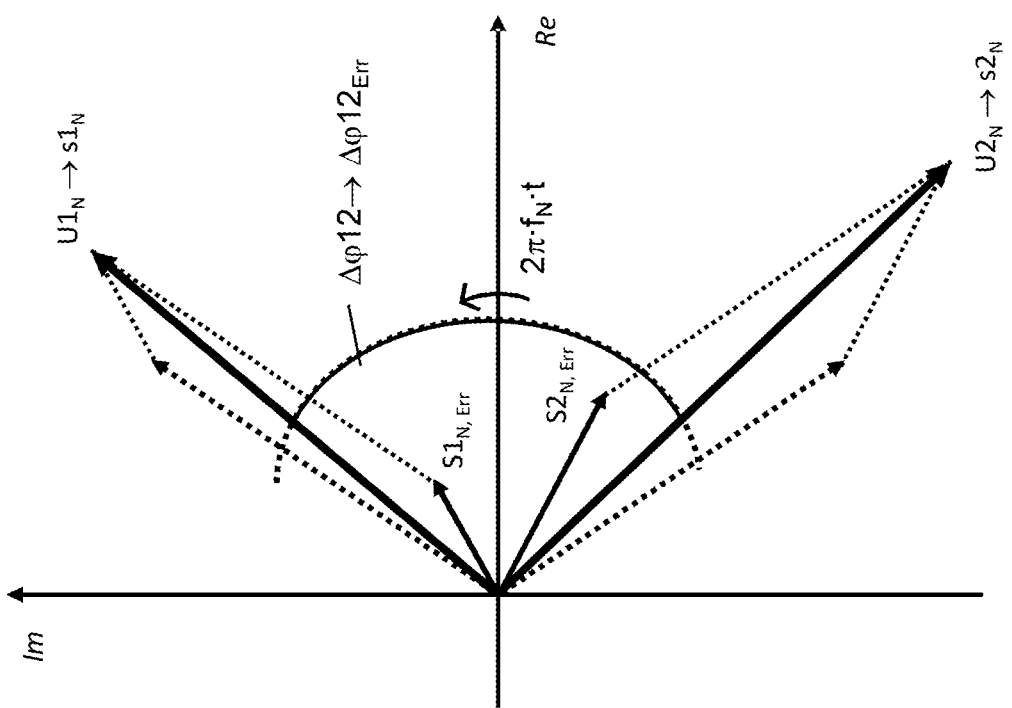
FIG. 3 shows a phasor diagram (vector diagram with frozen vectors) for signal components of oscillation measurement signals generated by means of a Coriolis mass flowmeter of FIG. 1, e.g. by means of a transmitter circuit of FIG. 2 connected to a measuring transducer of vibration-type.

The sensor arrangement of the measuring transducer is, in turn, adapted to register mechanical oscillations of the at least one vibration element 10, not least of all also forced mechanical oscillations of the at least one vibration element 10, and, in each case, to provide, at least partially, oscillation measurement signals (s1, s2) representing oscillatory movements of the at least one vibration element 10. For registering mechanical oscillations of the at least one vibration element, the sensor arrangement of the Coriolis mass flowmeter of the invention includes an electrodynamic, first oscillation sensor 51, for example, one formed by means of a first solenoid, and at least an electrodynamic, second oscillation sensor 52, for example, one formed by means of a second solenoid and/or embodied equally to the first oscillation sensor 51. Especially, the oscillation sensor 51 is adapted to convert oscillatory movements of the at least one vibration element 10 at a first measuring point into an electrical, first oscillation measurement signal s1 of the sensor arrangement, in such a manner that, as well as also indicated in FIG. 3, the oscillation measurement signal s1 has at least a (time t dependent) first wanted component $s1_N$, namely an alternating voltage component having a frequency corresponding to the wanted frequency $f_N$, and the oscillation sensor 52 is adapted to convert oscillatory movements of the at least one vibration element at a second measuring point removed from the first measuring point into an electrical, second oscillation measurement signal s2 of the sensor arrangement, in such a manner that, as well as also indicated in FIG. 3, the oscillation measurement signal s2 has at least a (time t dependent) second wanted component $s2_N$, namely an alternating voltage component having a frequency corresponding to the wanted frequency $f_N$. Since each of the two oscillation sensors 51, 52 is, in each case, an electrodynamic oscillation sensor, accordingly the wanted component $s1_N$ has an amplitude $U1_N$ (i.e. voltage level) dependent on the wanted frequency $f_N$ as well as on a first magnetic flux $\Phi1$, namely a magnetic flux of the oscillation sensor 51, and the wanted component $s2_N$ has an amplitude $U2_N$ (i.e. voltage level) dependent on the wanted frequency $f_N$ as well as on a second magnetic flux $\Phi2$, namely a magnetic flux of the oscillation sensor 52. Each of the two oscillation sensors can, such as quite usual in the case of measuring transducers of the type being discussed, be formed, for example, in each case, by means of a solenoid. Accordingly, according to an additional embodiment of the invention, it is provided that the first oscillation sensor has a first permanent magnet, for example, one connected mechanically with the at least one vibration element to form the first measuring point, as well as a first air coil, for example, one connected mechanically with the at least one vibration element and/or to the above described transducer housing, and the second oscillation sensor has a second permanent magnet, for example, one mechanically connected with the at least one vibration element to form the second measuring point, as well as a second air coil, for example, one connected mechanically with the at least one vibration element and/or to the above described transducer housing. The first permanent magnet forms a magnetic flux $\Phi1$ containing, first air gap, within which the first air coil is, at least partially, positioned and the second permanent magnet forms a magnetic flux $\Phi2$ containing, second air gap, within which the second air coil is, at least partially, positioned. Furthermore, the first permanent magnet and the first air coil are adapted to be moved relative to one another by oscillatory movements of the at least one vibration element and to generate a first induction voltage ($u_{i1}$) serving as oscillation measurement signal s1, and the second permanent magnet and the second air coil are adapted to be moved relative to one another by oscillatory movements of the at least one vibration element and to generate a second induction voltage ($u_{i2}$) serving as oscillation measurement signal s2, wherein the first and second induction voltages are, according to the law of induction (for movement induction):

$$u_{i1} = \frac{d\Psi 1}{dt} \sim \Psi 1 \cdot 2\pi \cdot f_N \cdot \cos(2\pi \cdot f_N \cdot t) \sim$$

$$N1 \cdot \Phi 1 \cdot 2\pi \cdot f_N \cdot \cos(2\pi \cdot f_N \cdot t) \to s1, \text{ or}$$

$$u_{i2} = \frac{d\Psi 2}{dt} \sim \Psi 2 \cdot 2\pi \cdot f_N \cdot \cos(2\pi \cdot f_N \cdot t) \sim$$

$$N2 \cdot \Phi 2 \cdot 2\pi \cdot f_N \cdot \cos(2\pi \cdot f_N \cdot t) \to s2$$

thus, in each case, dependent on a flux linkage or induction flux ($\Psi 1 = N1 \cdot \Phi 1$, $\Psi 2 = N2 \cdot \Phi 2$), namely a total magnetic flux within the first, second air coil, consequently the magnetic flux $\Phi 1$, $\Phi 2$ and an associated number of turns (N1, N2).

The oscillation measurement signals s1, s2 generated by the measuring transducer MT are then supplied to the transmitter circuit TC, for example, via electrical connection lines, in order, for example, to be appropriately processed by means of digital signal processing (DSP), for example, preamplified, filtered and digitized and thereafter correspondingly evaluated.

The oscillation sensors 51, 52 are according to an additional embodiment of the invention, additionally, so arranged that in the case of an exciting of the above described Coriolis oscillations of the at least one vibration element 10, each of the wanted components $s1_N$, $s2_N$ of the oscillation measurement signals s1, s2 has, additionally, in each case, also a phase angle dependent on mass flow m of the measured substance flowing through the measuring transducer MT, for example, measurable relative to the driver signal e1, or its wanted component $e1_N$; this, especially, in such a manner that, as well as also indicated in FIG. 3, between the wanted component $s1_N$ of the oscillation signal $s1_N$ and the wanted component $s2_N$ of the oscillation signal s2, a phase difference $\Delta\varphi 12$ ($\Delta\varphi 12 = f(m)$) dependent on mass flow m exists, namely a difference between the phase angle of the first wanted component $s1_N$ and the phase angle of the second wanted component $s2_N$, such that the oscillation measurement signals s1, s2 follow a change of the mass flow of the measured substance conveyed in the measuring transducer with a change of the phase difference $\Delta\varphi 12$ ($\Delta\varphi 12^*$). The oscillation sensors 51, 52 can, such as quite usual for such measuring transducers, or also indicated in FIG. 2, accordingly be positioned, for example, in each case, with the same separation from a center of mass of the at least one vibration element 10, for example, thus, from the center of mass of the at least one tube, or from the center of mass of the at least one displacement element, in such a manner that seen in the flow direction the oscillation sensor 51 is arranged at the inlet side of the at least one vibration element 10, or in its vicinity, and the oscillation sensor 52 is arranged at the outlet-side of the at least one vibration element 10, or in its vicinity. Additionally, the two oscillation sensors 51, 52 can also be the only oscillation sensors serving for registering oscillations of the at least one vibration element 10, in such a manner that the sensor arrangement except for oscillation sensors 51, 52 has no additional oscillation sensors. In an additional embodiment of the invention, it is, furthermore, provided that the sensor arrangement has for registering a temperature of the measuring transducer at a temperature measuring point at least one temperature sensor 61, which is adapted to provide a temperature measurement signal, namely a measurement signal representing the temperature at the temperature measuring point, especially with an electrical voltage dependent on the temperature and/or an electrical current dependent on the temperature. Alternatively or supplementally, the sensor arrangement can, for example, also have at least one strain sensor serving for registering mechanical stresses within the measuring transducer.

The transmitter circuit TC is, as already mentioned, besides for producing the driver signal e1, furthermore, also provided and adapted to receive and to evaluate the oscillation measurement signals s1, s2, namely based on the oscillation measurement signals s1, s2, for example, based on the above described phase difference $\Delta\varphi 12$ between the first and second wanted components, to ascertain mass flow-measured values representing the mass flow, for example, also to output such in the form of analog values and/or in the form of digital values. In an additional embodiment of the invention, the transmitter circuit TC is, accordingly, furthermore, adapted, firstly, to ascertain the phase difference $\Delta\varphi 12$ based on the oscillation measurement signals s1, s2. Additionally, the transmitter circuit TC can also be adapted to ascertain from at least one of the pending oscillation measurement signals s1, s2 the phase angle of its wanted component $s1_N$, $s2_N$, for example, relative to the driver signal e1, or its wanted component $e1_N$, and/or based on at least one of the oscillation measurement signals s1, s2 to ascertain the wanted frequency $f_N$, for example, also during operation to generate at least one phase sequence, namely a sequence of digital phase values correspondingly quantifying the phase angle of one of the first and second wanted components and/or a frequency sequence, namely a sequence of digital frequency values quantifying the wanted frequency $f_N$, in such a manner that the phase sequence corresponds to the phase angle of the corresponding wanted component as a function of time, or the frequency sequence corresponds to a wanted frequency as a function of time. The ascertaining of the phase angle, or the generating of the above described phase sequence can, for example, such as quite usual in the case of Coriolis mass flowmeters, be implemented by means of a quadrature demodulation (Q/I-demodulation) of the oscillation measurement signal performed in the transmitter circuit TC with a first harmonic reference signal (Q) having the wanted frequency and a second harmonic reference signal (I) phase-shifted therefrom by 90°. Particularly for the mentioned case, in which the wanted oscillations effected by means of driver signal e1 are resonant oscillations of the at least one vibration element 10, the wanted frequency $f_N$ of the oscillation measurement signals S1, s2 can serve as a measure for density and/or viscosity of the measured substance and, accordingly, density and/or viscosity can be ascertained by means of the transmitter circuit TC based on the above described frequency sequence. Particularly for the above described case, in which the sensor arrangement has a temperature sensor 61 and/or a strain sensor, the transmitter circuit TC is, according to an additional embodiment of the invention, furthermore, also adapted to receive and to process, especially to digitize and to evaluate, the temperature measurement signal generated by the temperature sensor, and the strain measurement signal generated by the strain sensor; this, for example, in such a manner that the transmitter circuit TC based on the at least one temperature measurement signal ascertains a temperature of the displacement element and/or a temperature of the measured substance.

In an additional embodiment of the invention, the transmitter circuit TC is adapted, furthermore, based on the oscillation measurement signal s1, to generate a first wanted component sequence, namely a sequence of digital amplitude values $U1_{N1}[m]$ ($m \in N$—natural numbers) quantifying the amplitude $U1_{N1}$ of the first wanted component $S1_N$ and the transmitter circuit is, additionally, adapted based on the oscillation measurement signal s2 to generate a second wanted component sequence, namely a sequence of digital amplitude values $U2_{N1}[n]$ ($n \in N$) quantifying the amplitude $U2_N$ of the second wanted component $s2_N$, for example, in such a manner that the amplitude values $U1_{N1}[m]$ are ascertained at equidistantly, sequentially following points in time $t_m = m \cdot T_{s1}$, consequently with a refresh rate $f_{s1} = 1/(t_{m+1} t_m) = 1/T_{s1}$, and the amplitude values $U2_N[n]$ are ascertained at equidistantly, sequentially following points in time to $= n \cdot T_{s2}$, consequently with a refresh rate $f_{s2} = 1/(t_{n+1} t_n) = 1/T_{s2}$, in such a manner that the first wanted component sequence at least approximately corresponds to an amplitude $U1_N$ of the first wanted component $s1_N$ as a function of time, and the second wanted component sequence at least approximately corresponds to an amplitude $U2_{N1}$ of the second wanted component $s2_N$ as a function of time. The above mentioned updating rates $f_{s1}$, $f_{s2}$ can, for example, be so selected that they are equally large ($f_{s1}=f_{s2}$) and/or that an amplitude value $U1_{N1}[m]$ is, thus, ascertained at essentially the same time as a corresponding amplitude value $U2_{N1}[n]$, i.e. ($t_m=t_n$). Moreover, the transmitter circuit TC can, furthermore, also be adapted based on the oscillation measurement signal s1 to generate a first harmonic component sequence, namely a sequence of digital amplitude values $U1_{N2}[m/2]$ ($m \in N$, $m>1$) quantifying the amplitude $U1_{N2}$ of the first harmonic component $S1_{N2}$ and the transmitter circuit is, additionally, adapted based on the oscillation measurement signal s2 to generate a second harmonic component sequence, namely a sequence of digital amplitude values $U2_{N2}[n/2]$ ($n \in N$, $n>1$) quantifying the amplitude $U2_{N2}$ of the second harmonic component $s2_{N2}$, for example, in such a manner that the amplitude values $U1_{N2}[m/2]$ are ascertained at equidistantly, sequentially following points in time $0.5 \cdot t_m = 0.5 \cdot m \cdot T_{s1}$, consequently with a refresh rate $2f_{s1} = 2/(t_{m+1} t_m) = 2/T_{s1}$, and the amplitude values $U2_{N2}[n/2]$ are ascertained at equidistantly, sequentially following points in time $0.5 \cdot t_n = 0.5 \cdot n \cdot T_{s2}$, consequently with a refresh rate $2f_{s2} = 2/(t_{n+1} t_n) = 2/T_{s2}$, in such a manner that the first harmonic component sequence at least approximately corresponds to an amplitude of the first harmonic component $s1_{N2}$ as a function of time, and the second harmonic component sequence corresponds to an amplitude of the second harmonic component $s2_{N2}$ as a function of time. The ascertaining of the harmonic components $s1_N$, $s2_N$, and the generating of the above described, first and second harmonic component sequence, can, for example, likewise be implemented by means of quadrature demodulation (Q/I-demodulation) of the oscillation measurement signal s1, s2, in this case, namely with a fourth harmonic reference signal (Q2) having the appropriate multiple, for example, twice, the wanted frequency and a fourth harmonic reference signal (I2) phase-shifted thereto by 90°. Alternatively or supplementally, the wanted- and/or harmonic components, thus their amplitudes $U1_{N1}$, $U2_{N1}$, $U1_{N2}$, $U2_{N2}$, can, for example, in each case, also be ascertained by means of a Fourier-analysis of the oscillation measurement signals s1, s2 performed in the transmitter circuit TC, for example, a discrete Fourier transformation (DFT) applied to the oscillation measurement signals s1, s2.

For processing the oscillation measurement signals s1, s2 delivered by the measuring transducer, in given cases, also the above described temperature- and/or strain measurement signal, for example, also for ascertaining the mass flow-measured values and, in given cases, also for ascertaining the density-measured values and/or viscosity-measured values, the transmitter circuit TC can, such as already indicated, have, furthermore, a corresponding measuring- and control electronics DSP, which, such as shown schematically in FIG. 2, is electrically connected with the measuring transducer MT, thus its sensor arrangement 51, 52, for example, in such a manner that the measuring- and control electronics DSP forms a first measurement signal input to the transmitter circuit TC for the oscillation measurement signal s1 as well as at least a second measurement signal input to the transmitter circuit TC for the oscillation measurement signal s2. The measuring- and control electronics DSP can advantageously be adapted digitally to process the supplied oscillation measurement signals s1, s2, and, in given cases, also the temperature- and/or strain measurement signals, for example, by means of at least one microprocessor and/or at least one digital signal processor (DSP) and/or by means of a programmable logic chip (FPGA) and/or by means of a customer specific programmed logic chip (ASIC—application-specific integrated circuit). The program-code executed during operation of the Coriolis mass flowmeter in one or more of the above described microprocessors, or digital signal processors, of the transmitter circuit TC can, in each case, be stored e.g. persistently in one or more non-volatile data memories (EEPROM) of the transmitter circuit TC and upon start-up of the same be loaded into a volatile data memory (RAM) provided in the transmitter circuit TC, or in the measuring- and control electronics DSP, e.g. integrated in the microprocessor. For processing in the microprocessor, or in the digital signal processor, the oscillation measurement signals s1, s2 are, firstly, transformed into corresponding digital signals by means of an analog to digital converter (A/D), for example, by digitizing the signal voltage of the oscillation measurement signals s1, s2; for this, compare, for example, the above cited U.S. Pat. No. 6,311,136 or US-A 2011/0271756. Accordingly, according to an additional embodiment of the invention, there is provided in the transmitter circuit TC, for example, in the measuring- and control electronics DSP, a first analog to digital converter for the oscillation measurement signal s1 as well as a second analog to digital converter for the oscillation measurement signal s2 and/or there is provided in the transmitter circuit TC at least one non-volatile electronic data memory EEPROM, which is adapted to supply digital data, for example, also without an applied operating voltage. By means of the measuring- and control electronics DSP, additionally, also the above-mentioned phase sequence and/or the above-mentioned frequency sequence can be generated, for example, also output to a corresponding digital phase output, or to a corresponding digital frequency output and so be provided for further processing in the transmitter circuit TC. For the case, in which the transmitter circuit TC is formed by means of the above-mentioned drive electronics Exc as well as by means of the above described measuring- and control electronics DSP, its phase output can be electrically connected with a phase input of a phase comparator provided in the drive electronics Exc, and, for example, also forming a component of the above mentioned phase control loop (PLL), and, additionally, the phase comparator can be adapted, based on the phase sequence, to detect a phase difference between the above referenced signal component $e1_N$ of the driver signal e1 and at least one of the wanted components $s1_N$, $s2_N$ and/or to ascertain an extent of the phase difference. In an additional embodiment of the invention, the measuring- and control electronics DSP is, furthermore, also adapted to form the above described, first and second wanted component sequences and to output at least one of the wanted component sequences to a digital amplitude output. The above-mentioned amplitude output of the measuring- and control electronics DSP can, furthermore, for example, also be electrically connected with an amplitude input of the drive electronics Exc registering an amplitude of the oscillations of the at least one vibration element 10 and the drive electronics Exc can, additionally, be adapted based on the amplitude sequence of the driver signal e1 so to generate that the oscillations of the at least one vibration element, or its wanted oscillations, achieve a predetermined oscillation amplitude, and do not continuously overshoot—or undershoot such.

Figure 4B:
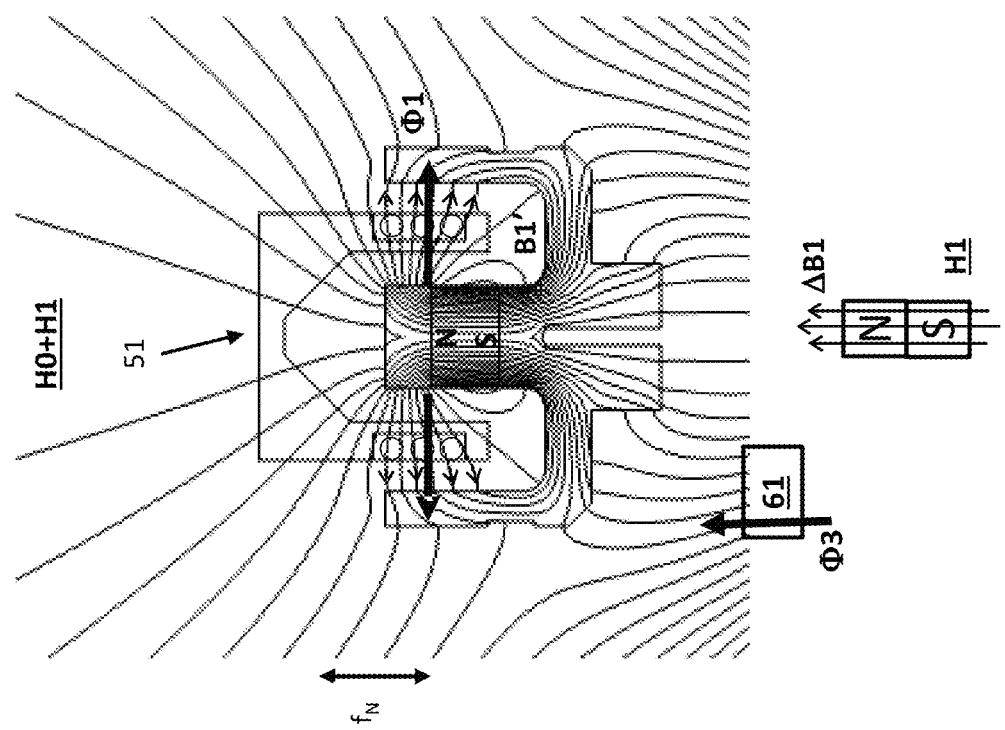
FIGS. 4a, 4b shows schematically, components of a sensor arrangement, namely an oscillation sensor as well as a magnetic field sensor, suitable for a measuring transducer of FIG. 2, e.g. for a Coriolis mass flowmeter of FIG. 1, in a sectioned, side view as well as field lines of magnetic fields passing through the sensor arrangement.

As already mentioned, the wanted components of the two oscillation measurement signals s1, s2, or their amplitudes, are, because of the principle of action of the two electrodynamic oscillation sensors, dependent on the time rate of change of the magnetic flux within the oscillation sensors, in the case of a solenoid as oscillation sensor, namely the flux linkage-, or induction flux within the respective air coil; this, especially, also in such a manner that an additional influencing of the known inner magnetic field H0 effected from outside of the Coriolis mass flowmeter during its measurement operation, or an associated influencing of a known change with time ($\Delta\Phi 1/\Delta t$, $\Delta\Phi 2/\Delta t$) of the magnetic flux within the first and/or second oscillation sensor, as ascertained by the above-mentioned calibration, not least of all also a change with time ($\Delta\Phi 1$, $\Delta\Phi 2$) of the magnetic flux $\Phi 1$, $\Phi 2$ per oscillation period of the wanted oscillations, caused by an external magnetic field H1, namely an external magnetic field from outside of the Coriolis mass flowmeter, equally as well, also propagating within the Coriolis mass flowmeter, can bring about an undesired influencing of the first and/or second wanted component, for example, an influencing leading to increased errors in the measuring of the mass flow, consequently a degrading of the ability of the sensor arrangement to function. Causes for such an external magnetic field H1 can be, for example, an electrical field produced in the vicinity of the Coriolis mass flowmeter, for instance, because of electric motors, transformers, inverters or high electrical (dc-) currents in system portions, such as e.g. bus bars, operated in the vicinity of the Coriolis mass flowmeter and/or, as well as also indicated in FIG. 4b, a magnet positioned outside of the Coriolis mass flowmeter in its vicinity, for example, an electromagnet or a permanent magnet. In the case of plunger coils, solenoids, as oscillation sensors, the above-mentioned inner magnetic field H0 is, thus, determined essentially by the permanent magnet, thus the above-mentioned change with time of the magnetic flux is determined essentially by the movements of the permanent magnet in its air gap corresponding to the oscillatory movements of the at least one vibration element and the external magnetic field H1 can lead to the fact that at least one of the inner magnetic field H0 providing, previously indicated flux densities (B1, B2) of the magnetic fluxes $\Phi 1$, $\Phi 2$ is changed (B1→B1'=B1+$\Delta$B1, B1→B2'=B2+$\Delta$B2). Such an undesired influencing of the first and/or second wanted component $s1_N$, $s2_N$, thus a degrading of the ability of the sensor arrangement to function as a result of an external magnetic field H1, can, for example, also be a result of the fact that, as well as also in FIG. 3 indicated, at least one of the wanted components contains an additional, equal frequency disturbance component ($S1_{N,\,Err}$, $S2_{N,\,Err}$), in such a manner that the above-mentioned phase angle of the wanted component, consequently also the above-mentioned phase difference $\Delta\varphi 12$ ($\Delta\varphi 12 \rightarrow \Delta\varphi 12_{Err}$), then has a phase error, namely a portion dependent on the external magnetic field H1, or its influence on the magnetic flux lastly established in the sensor; this, for example, also in such a manner that the integrity of at least one of the oscillation measurement signals, and, thus, the mass flow-measured values, is reduced inacceptably, thus the phase error leads to an accuracy of measurement, with which the transmitter circuit TC ascertains the mass flow-measured values, which lies outside of a tolerance range predetermined for the Coriolis mass flowmeter.

Figure 4A:
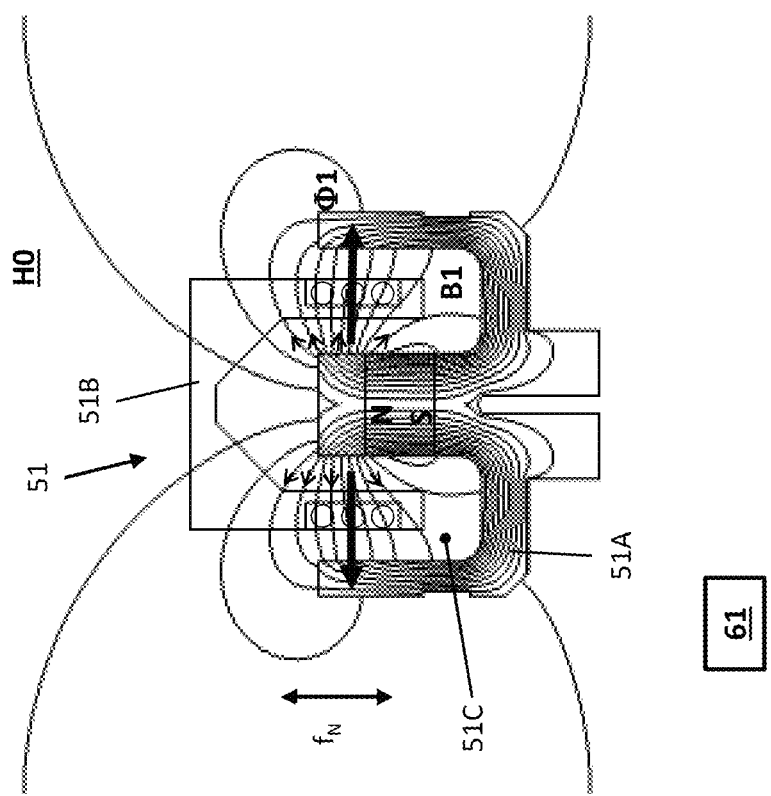
Figure 5B:
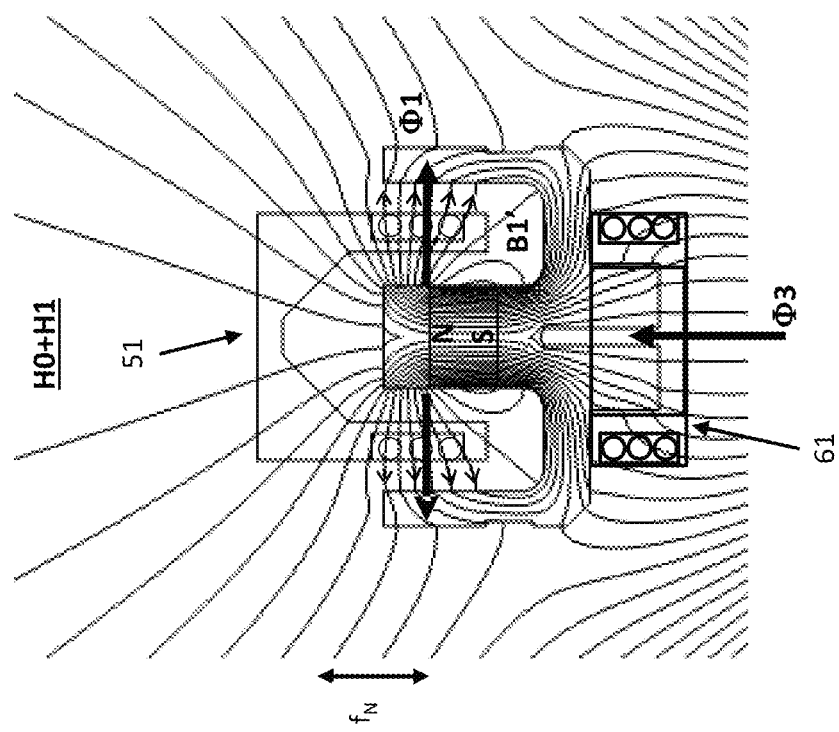
FIGS. 5a, 5b shows schematically, an embodiment for a sensor arrangement of FIGS. 4a and 4b in a sectioned, side view, as well as field lines of magnetic fields passing through the sensor arrangement.
Figure 5A:
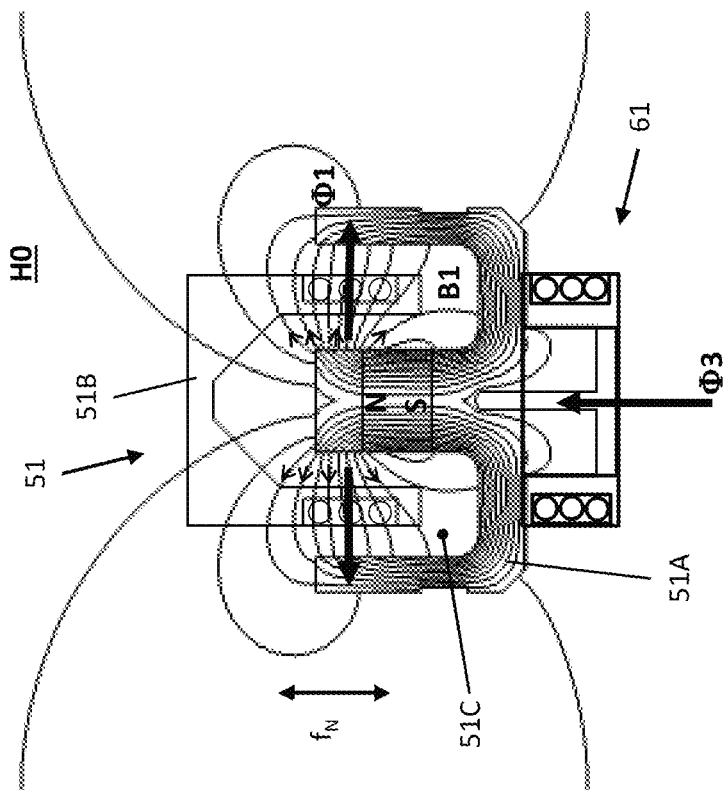
Figure 6A:
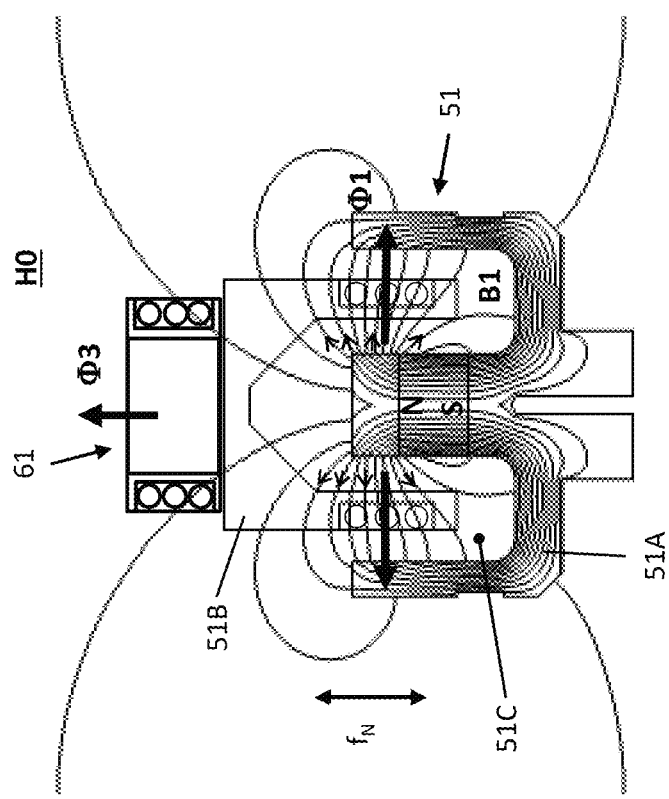
FIGS. 6a, 6b shows schematically, another embodiment for a sensor arrangement of FIGS. 4a and 4b in a sectioned, side view, as well as field lines of magnetic fields passing through the sensor arrangement.
Figure 6B:
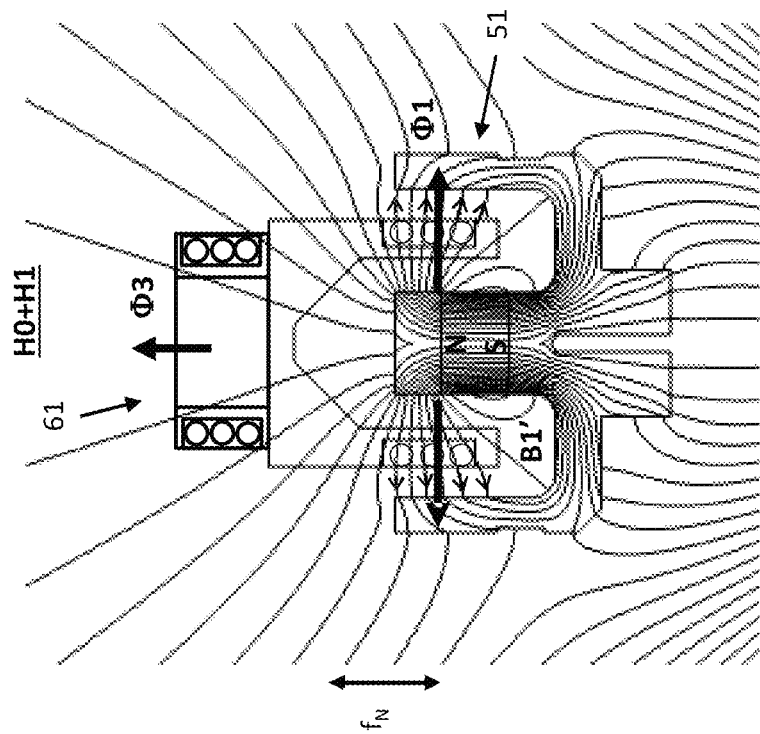

In order to enable an as near as possible in time, equally as well, precise, detecting of an external magnetic field H1, in given cases, degrading the ability of the sensor arrangement to function, or bringing about an increased measurement error lying outside a specification of the Coriolis mass flowmeter, the sensor arrangement of the measurement system of the invention includes, as well as also shown schematically in FIGS. 4a and 4b, furthermore, at least a first magnetic field detector 61 serving for registering a magnetic field H0+H1 originating, at least partially, also outside of the oscillation sensors 51, 52, in this case, especially resulting from superpositioning of the internal magnetic field H0 and an external magnetic field H1. The magnetic field detector 61 is, especially, adapted to convert changes of the magnetic field H0+H1 at a third measuring point removed both from the above described, first measuring point as well as also from the above described, second measuring point into a, for example, electrical, first magnetic field signal $\varphi 1$ of the sensor arrangement having an amplitude U3 dependent on a third magnetic flux $\Phi 3$, in this case, a third magnetic flux originating both outside of the oscillation sensor 51 as well as also outside of the oscillation sensor 52, namely a magnetic flux through the magnetic field detector 61 and/or dependent on an areal density B3 of the magnetic flux $\Phi 3$, in such a manner that the magnetic field signal $\varphi 1$ follows at least a change of the magnetic flux $\Phi 3$ and/or its areal density B3 with a change of amplitude U3. The magnetic field detector 61 can be formed, for example, by means of at least one Hall-sensor and/or by means of at least one reed switch and/or, as well as also indicated in FIGS. 5a, 5b, 6a and 6b, in each case, by means of an air coil. In the case of the measurement system of the invention, additionally, the transmitter circuit TC is also adapted based on the magnetic field signal $\varphi 1$ to ascertain, at least qualitatively, whether within the measuring transducer, supplementally to the internal magnetic field H0, also an above-mentioned external magnetic field H1 is present, for example, to ascertain, whether a disturbance of the measuring transducer by an external magnetic field H1 is present, especially a disturbance lessening an ability of the sensor arrangement to function and/or a disturbance effecting a malfunctioning of the sensor arrangement and/or a disturbance reducing an integrity of at least one of the first and second oscillation measurement signals, and, thus, the mass flow-measured values. Accordingly, the magnetic field signal $\varphi 1$ can be, for example, a signal only qualitatively evaluating the above-mentioned magnetic field H0+H1, or changes of the internal magnetic field H0, or only assuming discrete values in a limited extent, for example, also a binary switching signal having nominally only two states. The magnetic field signal $\varphi 1$ can, however, for example, also be an analog signal quantifying the magnetic field H0+H1, or its changes, value- and time continuously, for example, an analog electrical signal with a voltage dependent on the magnetic flux $\Phi 3$ and/or its areal density B3.

Particularly for the above-described case, in which the magnetic field detector 61 is formed by means of at least one air coil, the magnetic field detector 61 can advantageously be secured on the at least one vibration element, in such a manner that also the magnetic field detector 61 is adapted to follow the oscillatory movements of the vibration element 10, for example, those of the wanted-oscillations, and to generate an induction voltage ($u_{i3}$) serving as magnetic field signal ɸ1, which corresponding to the law of induction (for movement induction):

$$u_{i3} = \frac{d\Psi 3}{dt} \sim \Psi 3 \cdot 2\pi \cdot f_N \cdot \cos(2\pi \cdot f_N \cdot t) \sim N3 \cdot \Phi 3 \cdot 2\pi \cdot f_N \cdot \cos(2\pi \cdot f_N \cdot t) \rightarrow \varphi 1$$

depends on a corresponding flux linkage-, or induction flux ($\Psi 3 = N3 \cdot \Phi 3$), namely a total magnetic flux within the air coil, thus on the magnetic flux Φ3 and an associated number of turns (N3).

The magnetic field detector 61 can, for example, be accommodated within the electronics housing 200; alternatively the magnetic field detector 61 can, however, also, as well as schematically shown in FIG. 2, be accommodated within the transducer housing 100, for example, also directly secured to the transducer housing. In an additional embodiment of the invention, it is, accordingly, furthermore, provided that the magnetic field detector 61 is positioned in the vicinity of the oscillation sensor 51, for example, also less than 5 cm removed therefrom, and/or, as well as also shown schematically in FIGS. 5a, 5b, 6a and 6b, in each case, or directly evident from their combination, directly mounted at the oscillation sensor 51. For the above-described case, in which the oscillation sensor 51 is formed by means of a solenoid, the magnetic field detector 61 can, as well as also directly evident from FIGS. 5a and 5b, or 6a and 6b, advantageously also be placed on the corresponding permanent magnet 51A of the oscillation sensor 51 or even on its air coil 51B; this not least of all also for the case, in which the magnetic field detector 61 is likewise formed by means of an air coil, for example, also in such a manner that the air coil of the magnetic field detector 61 is oriented coaxially with the air coil 51B, or with the permanent magnet 51A of the oscillation sensor 51.

Particularly for the above-described case, in which the magnetic field signal ɸ1 is embodied as an analog signal, the transmitter circuit is, according to an additional embodiment of the invention, furthermore, also adapted based on the at least one magnetic field signal, at least at times, also to calculate one or more values for at least one magnetic field characterizing number MK1, for example, one characterizing an influencing of the sensor arrangement by the external magnetic field and/or an influencing of at least one of the magnetic fluxes Φ1, Φ2; this especially in such a manner that the magnetic field characterizing number MK1 depends on a deviation of the magnetic flux Φ1 from the magnetic flux Φ2 and/or evaluates and/or quantifies the deviation; alternatively, the magnetic field characterizing number MK1 also can be so selected, or so calculated, that the magnetic field characterizing number MK1 depends on a deviation of the magnetic flux Φ3 from an earlier ascertained, reference value and therewith indirectly also from a deviation at least of the magnetic flux Φ1 from the reference value and/or evaluates and/or quantifies the deviation, for the sensors characterizing number MK1, for example, thus, the following holds:

$$MK1 = f(U3) = f(\Phi 3(\Phi 1)) = f(H0, H1) \quad (1)$$

The magnetic field characterizing number MK1 can be ascertained recurringly during operation of the Coriolis mass flowmeter by means of the transmitter circuit TC, for example, based on digital amplitude values ascertained for the amplitude U3 of the magnetic field signal ɸ1. For the case, in which at least one non-volatile electronic data memory EEPROM is provided in the transmitter circuit TC, the transmitter circuit TC can, additionally, be adapted to store one or more of the above described digital amplitude values for the amplitude U3 in the data memory EEPROM, for example, also, in each case, together with a numerical value for a time variable (time stamp) corresponding to a point in time of ascertaining the characterizing number value.

For detecting the presence of an external magnetic field degrading the ability of the sensor arrangement to function, consequently degrading the accuracy of measurement of the Coriolis mass flowmeter, the transmitter circuit TC is, according to an additional embodiment of the invention, furthermore, adapted to evaluate one or more values for the at least one magnetic field characterizing number MK1, for example, in each case, to compare such with one or more reference values $BK1_1$ ($BK1_1$, $BK1_2$ ... $BK1_i$ ... ) earlier ascertained for the magnetic field characterizing number MK1 and, for example, stored in the aforementioned non-volatile electronic data memory EEPROM. Accordingly, the transmitter circuit TC is, furthermore, also adapted to ascertain, whether one or more values for the magnetic field characterizing number MK1 is/are greater than one or more reference values for the magnetic field characterizing number MK1 representing, for example, a no longer intact Coriolis mass flowmeter and, in given cases, for example, also to output a (disturbance-)message signaling this, for example, to display such on-site and/or to transmit such as a status message to the above-mentioned electronic data processing system. The above mentioned reference values for the magnetic field characterizing number MK1 can be, for example, reference values representing a (external magnetic field attributable) lessened ability of the sensor arrangement to function, or a (external magnetic field attributable) malfunctioning of the sensor arrangement. The reference values can be ascertained, for example, earlier, for example, by the manufacturer of the Coriolis mass flowmeter, or in the case of a (plant-)calibration completed during manufacture of the Coriolis mass flowmeter and/or during the start-up on-site, and/or during operation of the Coriolis mass flowmeter; this, for example, in such a manner that, firstly, the magnetic field characterizing number MK1 for the finished, consequently intact, Coriolis mass flowmeter is ascertained and with a tolerance value corresponding to a still tolerable influencing correspondingly converted into the reference value $BK1_1$ and/or that the magnetic field characterizing number MK1 is ascertained by means of the otherwise intact Coriolis mass flowmeter being positioned in the vicinity of a magnet effecting a reference magnetic field and directly stored as reference value $BK1_1$ in the data memory EEPROM.

The ascertaining of the values MK1, or the ascertaining of the presence of an external magnetic field, can be initiated, or ceased, as the case may be, for example, automatically, for example, as a function of time and/or even as a function of changes of other diagnostic values. Alternatively or supplementally, the ascertaining of the values can, however, also be initiated and/or ceased outside of the Coriolis mass flowmeter, for example, via the aforementioned electronic data processing system via the above-mentioned transmitting- and receiving electronics COM and/or by an operator on-site via the above-mentioned display- and interaction element HMI. Accordingly, the transmitter circuit is according to an additional embodiment adapted to receive and to evaluate a start-command initiating at least the ascertaining of the values for at least the magnetic field characterizing number MK1, in given cases, namely also its above-mentioned evaluation, namely to set in motion an inputting of the start-command to detect and then ascertain the values for the first magnetic field characterizing number MK1 and/or the transmitter circuit is adapted to receive and to evaluate a stop-command at least temporarily suppressing the ascertaining of the values for the magnetic field characterizing number MK1, namely to detect an inputting of the stop-command and then at least temporarily, to stop ascertaining the values for the first magnetic field characterizing number MK1.

Figure 7B:
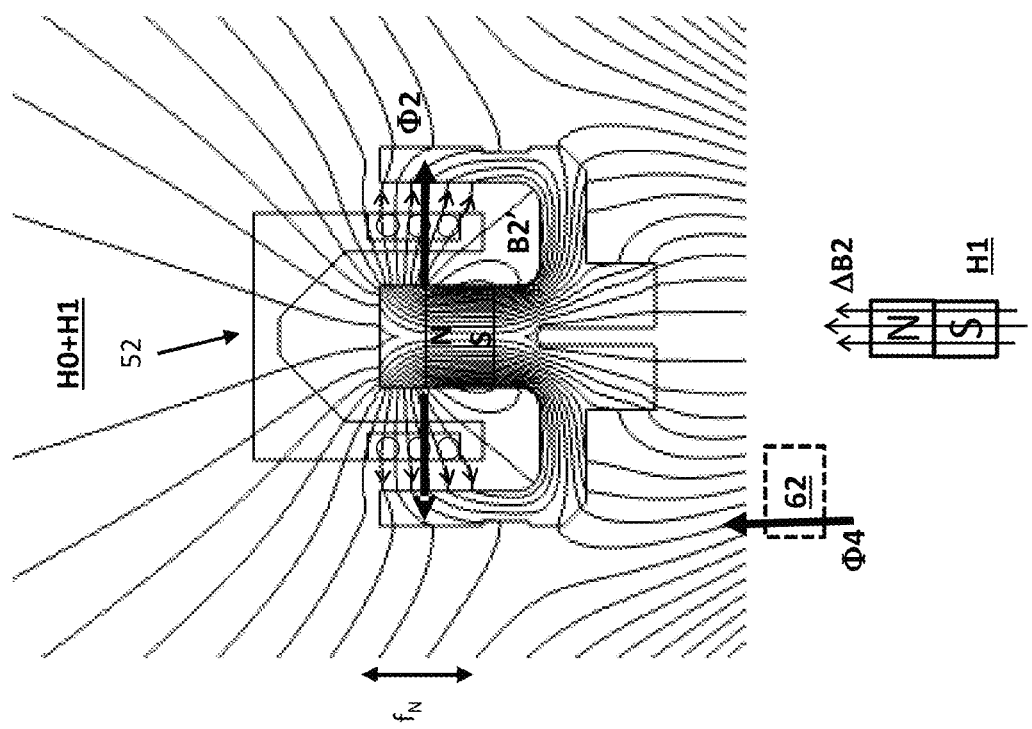
FIGS. 7a, 7b shows schematically an additional oscillation sensor of a sensor arrangement of FIGS. 4a and 4b in a sectioned, side view as well as field lines of magnetic fields passing through the sensor arrangement.
Figure 7A:
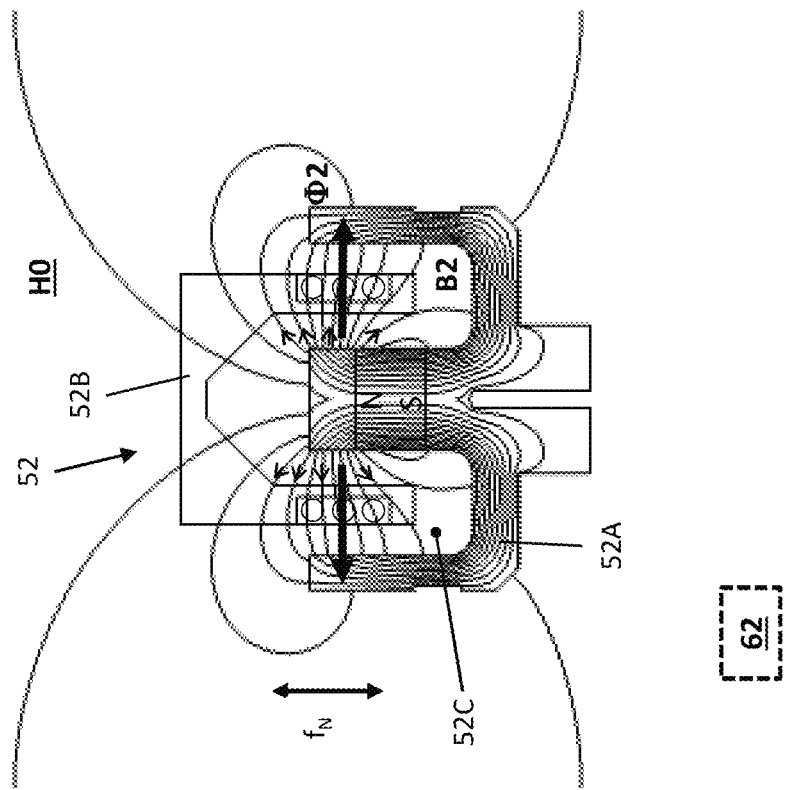

In order further to increase the accuracy, or reliability, with which the presence of the external magnetic field can be determined, according to an additional embodiment of the invention, it is provided that the sensor arrangement for registering the magnetic field has, as well as also indicated in FIGS. 2, 7a and 7b, in each case, or also directly evident from their combination, at least a second magnetic field detector 62, for example, one embodied equally to the magnetic field detector 61. The second magnetic field detector 62 is adapted to convert changes of the magnetic field H0, or H0+H1, as the case may be, at a fourth measuring point removed from the above described third measuring point, for example, also removed from the first measuring point and/or from the second measuring point, into a second magnetic field signal $\phi2$ of the sensor arrangement, especially a second magnetic field signal evaluating the changes of the magnetic field and/or quantifying the changes and/or an electrical, second magnetic field signal, which has an amplitude U4 dependent on a fourth magnetic flux $\Phi4$, namely a magnetic flux of the magnetic field detector 62 and/or an areal density B4 of the magnetic flux $\Phi4$, in such a manner that the magnetic field signal $\phi2$ follows at least a change of the fourth magnetic flux $\Phi4$ and/or its areal density B4 with a change of amplitude U4. Furthermore, the transmitter circuit is, additionally, adapted also to receive and to evaluate the magnetic field signal $\phi2$, namely based also on the magnetic field signal $\phi2$ to ascertain whether the external magnetic field H1 is present. The magnetic field detector 62 can, for example, be placed on the oscillation sensor 52 or positioned in its vicinity, especially removed less than 5 cm therefrom. Alternatively or supplementally, the magnetic field signal $\phi2$ can also be an analog signal, for example, having a voltage dependent on the magnetic flux $\Phi4$ and/or its areal density B4.

The invention claimed is:

1. A Coriolis mass flowmeter for measuring mass flow of a fluid measured substance, the Coriolis mass flowmeter comprising:
    a measuring transducer having at least one vibration element, an exciter arrangement, and a sensor arrangement and which is adapted to be flowed through by the measured substance; and
    an electronic transmitter circuit electrically coupled with the exciter arrangement and the sensor arrangement, wherein the electronic transmitter includes at least one microprocessor;
    wherein the at least one vibration element is adapted to be contacted by the flowing measured substance and during that to be caused to vibrate,
    wherein the exciter arrangement is adapted to convert electrical power supplied to it into mechanical power effecting forced mechanical oscillations of the at least one vibration element, wherein the transmitter circuit is adapted to generate an electrical driver signal and therewith to supply electrical power to the exciter arrangement such that the vibration element executes wanted oscillations, namely forced mechanical oscillations having at least one wanted frequency, namely an oscillation frequency predetermined by the electrical driver signal corresponding to a resonant frequency of the measuring transducer and suitable to bring about in the flowing measured substance Coriolis forces dependent on mass flow,
    wherein, for registering mechanical oscillations of the at least one vibration element, the sensor arrangement includes an electrodynamic, first oscillation sensor and at least an electrodynamic, second oscillation sensor embodied equally to the first oscillation sensor,
    wherein the first oscillation sensor is adapted to convert oscillatory movements of the at least one vibration element at a first measuring point into an electrical, first oscillation measurement signal of the sensor arrangement such that the first oscillation measurement signal has at least a first wanted component, namely an alternating voltage component having a frequency corresponding to the wanted frequency and having an amplitude dependent on the wanted frequency and a first magnetic flux, namely a magnetic flux of the first oscillation sensor,
    wherein the second oscillation sensor is adapted to convert oscillatory movements of the at least one vibration element at a second measuring point removed from the first measuring point into an electrical, second oscillation measurement signal of the sensor arrangement such that the second oscillation measurement signal has at least a second wanted component, namely an alternating voltage component having a frequency corresponding to the wanted frequency and having an amplitude dependent on the wanted frequency and a second magnetic flux, namely a magnetic flux of the second oscillation sensor,
    wherein, for registering a magnetic field established outside of the first and second oscillation sensors, the sensor arrangement includes a first magnetic field detector adapted to convert changes of the magnetic field at a third measuring point removed both from the first measuring point and from the second measuring point into a first magnetic field signal of the sensor arrangement evaluating and/or quantifying the changes and/or an electrical, first magnetic field signal, which has an amplitude dependent on a third magnetic flux, namely a magnetic flux through the first magnetic field detector and/or on an areal density of the magnetic flux, in such a manner that the first magnetic field signal follows at least a change of the third magnetic flux and/or its areal density with a change of its amplitude, and
    wherein the transmitter circuit is adapted to receive and to evaluate both the first and second oscillation measurement signals and the first magnetic field signal, namely:
        based on the first and second oscillation measurement signals, to ascertain mass flow measured values representing the mass flow, wherein each of the first and second wanted components includes a phase angle dependent on the mass flow, and wherein the mass flow measured values are calculated from a phase difference between the phase angle of the first wanted component and the phase angle of the second wanted component; and based on the first magnetic field signal, to ascertain whether within the measuring transducer an external magnetic field is present, including an external magnetic field produced by an electrical field outside of the Coriolis mass flowmeter and/or caused by a magnet positioned outside of the Coriolis mass flowmeter, and to ascertain whether a disturbance of the measuring transducer due to the external magnetic field is present, including a disturbance lessening an ability of the sensor arrangement to function and/or effecting a malfunction of the sensor arrangement and/or reducing an integrity of at least one of the first and second oscillation measurement signals, or the mass flow measured values, and wherein the phase difference includes a phase difference error caused by the disturbance, which phase error affects an accuracy with which the transmitter circuit ascertains the mass flow measured values such that the accuracy is outside a predetermined tolerance range of the Coriolis mass flowmeter.

2. The Coriolis mass flowmeter as claimed in claim 1, wherein the first magnetic field signal is an analog signal, including a continuous value and continuous time analog signal having a voltage dependent on the third magnetic flux and/or on its areal density.

3. The Coriolis mass flowmeter as claimed in claim 2, wherein the transmitter circuit is adapted, based on the first magnetic field signal, to calculate values for at least one magnetic field characterizing number, including a magnetic field characterizing number characterizing an influencing of the sensor arrangement by the external magnetic field and/or an influencing of at least one of the first and second magnetic fluxes such that the magnetic field characterizing number depends on a deviation of the first magnetic flux from the second magnetic flux and/or evaluates and/or quantifies the deviation or such that the magnetic field characterizing number depends on a deviation of the first magnetic flux from an earlier ascertained reference value and/or evaluates and/or quantifies the deviation.

4. The Coriolis mass flowmeter as claimed in claim 3, wherein the transmitter circuit is adapted to compare one or more values for the magnetic field characterizing number with one or more reference values for the magnetic field characterizing number, including reference values ascertained by the manufacturer of the Coriolis mass flowmeter and/or in the production of the Coriolis mass flowmeter, including one or more reference values representing a lessening of the sensor arrangement to function and/or one or more reference values representing a malfunction of the sensor arrangement and/or one or more reference values representing a no longer intact Coriolis mass flowmeter.

5. The Coriolis mass flowmeter as claimed in claim 4, wherein the transmitter circuit is adapted to ascertain whether one or more values for the magnetic field characterizing number is greater than the at least one reference value for the magnetic field characterizing number when one or more values for the magnetic field characterizing number is greater than one or more reference values representing a lessening of the sensor arrangement to function and/or greater than one or more reference values representing a malfunction of the sensor arrangement and/or greater than one or more reference values representing a no longer intact Coriolis mass flowmeter, to output a message signaling such.

6. The Coriolis mass flowmeter as claimed in claim 3, wherein the transmitter circuit includes a non-volatile electronic data memory adapted to store digital data without an applied operating voltage, and to store one or more earlier ascertained, reference values for the magnetic field characterizing number.

7. The Coriolis mass flowmeter as claimed in claim 6, wherein there are stored in the electronic data memory one or more reference values for the magnetic field characterizing number, including reference values earlier ascertained by the manufacturer of the Coriolis mass flowmeter and/or in the production of the Coriolis mass flowmeter and/or during operation of the Coriolis mass flowmeter, especially one or more reference values representing a lessening of ability of the sensor arrangement to function and/or one or more reference values representing a malfunction of the sensor arrangement.

8. The Coriolis mass flow measuring device as claimed in claim 7, wherein the transmitter circuit is adapted to compare one or more values for the magnetic field characterizing number, in each case, with one or more reference values for the magnetic field characterizing number stored in the data memory.

9. The Coriolis mass flow measuring device as claimed in claim 1, wherein the first magnetic field detector is positioned at the first oscillation sensor or in its vicinity.

10. The Coriolis mass flowmeter as claimed in claim 1, wherein the first magnetic field detector is secured at the at least one vibration element.

11. The Coriolis mass flowmeter as claimed in claim 1, further comprising:

a transducer housing, wherein the at least one vibration element, the exciter arrangement as well as at least partially the sensor arrangement are accommodated within the transducer housing in such a manner that the at least one vibration element is secured to the transducer housing and/or that the first magnetic field detector is accommodated within the transducer housing and secured thereto.

12. The Coriolis mass flowmeter as claimed in claim 1, further comprising:

an electronics housing, wherein the transmitter circuit is accommodated within the electronics housing, including both the transmitter circuit and the first magnetic field detector.

13. The Coriolis mass flowmeter as claimed in claim 1, wherein the first oscillation sensor is formed by a first solenoid, and the second oscillation sensor is formed by a second solenoid.

14. The Coriolis mass flowmeter as claimed in claim 13, wherein the first oscillation sensor includes a first permanent magnet connected mechanically with the at least one vibration element to form the first measuring point and a first air coil, wherein the first permanent magnet forms a first air gap containing the first magnetic flux and the first air coil is positioned, at least partially, within the first air gap, wherein the first permanent magnet and the first air coil are adapted to be moved relative to one another by oscillatory movements of the at least one vibration element and to generate a first induction voltage serving as first oscillation measurement signal, wherein the second oscillation sensor includes a second permanent magnet connected mechanically with the at least one vibration element to form the second measuring point and a second air coil, wherein the second permanent magnet forms a second air gap containing the second magnetic flux and the second air coil is positioned, at least partially, within the second air gap, and wherein the second permanent magnet and the second air coil are adapted to be moved relative to one another by oscillatory movements of the at least one vibration element and to generate a second induction voltage serving as second oscillation measurement signal.

15. The Coriolis mass flowmeter as claimed in claim 1, wherein the first magnetic field detector is formed by at least one air coil secured at the at least one vibration element.

16. The Coriolis mass flowmeter as claimed in claim 1, wherein the first magnetic field detector includes at least one Hall-sensor.

17. The Coriolis mass flowmeter as claimed in claim 1, wherein the first magnetic field detector includes at least one reed switch.

18. The Coriolis mass flowmeter as claimed in claim 1,
wherein the sensor arrangement includes for registering the magnetic field at least a second magnetic field detector which is adapted to convert changes of the magnetic field at a fourth measuring point removed from the third measuring point and also removed from the first measuring point and/or from the second measuring point, into a second magnetic field signal of the sensor arrangement, including a second magnetic field signal evaluating and/or quantifying the changes and/or an electrical, second magnetic field signal which has an amplitude dependent on a fourth magnetic flux, namely a magnetic flux of the second magnetic field detector, and/or on an areal density of the magnetic flux, in such a manner that the second magnetic field signal follows at least a change of the fourth magnetic flux and/or its areal density with a change of amplitude; and wherein the transmitter circuit is adapted also to receive and to evaluate the second magnetic field signal, namely based also on the second magnetic field signal to ascertain, whether an external magnetic field is present.

19. The Coriolis mass flowmeter as claimed in claim 18,
wherein the second magnetic field detector is mounted at the second oscillation sensor or positioned in its vicinity, and/or wherein the second magnetic field signal is an analog signal having a voltage dependent on the fourth magnetic flux and/or its areal density.

20. The Coriolis mass flowmeter as claimed in claim 1, wherein the transmitter circuit includes a measuring and control electronics, which includes a first analog to digital converter for the first oscillation measurement signal and a second analog to digital converter for the second oscillation measurement signal.

21. The Coriolis mass flowmeter as claimed in claim 20, wherein the measuring and control electronics includes a third analog to digital converter for the first magnetic field signal.

22. The Coriolis mass flowmeter as claimed in claim 21, wherein the measuring and control electronics includes a fourth analog to digital converter for the second magnetic field signal.

23. The Coriolis mass flowmeter as claimed in claim 1, wherein the exciter arrangement for exciting oscillations of the at least one measuring tube-includes an electrodynamic and/or single, oscillation exciter.

24. The Coriolis mass flowmeter as claimed in claim 1, wherein the at least one vibration element includes at least one at least sectionally straight and/or at least sectionally circular arc-shaped, tube having a metal tube wall and a lumen surrounded thereby and adapted to be flowed through by the measured substance while being caused to vibrate.

25. The Coriolis mass flowmeter as claimed in claim 1, wherein the phase error caused by the disturbance effects a deviation of the first magnetic flux from the second magnetic flux.

26. The Coriolis mass flowmeter as claimed in claim 25, wherein the phase error caused by the disturbance effects a deviation of the first magnetic flux from an earlier ascertained reference value.

* * * * *